United States Patent
Yanagi et al.

(10) Patent No.: US 11,284,060 B2
(45) Date of Patent: Mar. 22, 2022

(54) DISPLAY DEVICE AND DISPLAY SYSTEM

(71) Applicant: Japan Display Inc., Tokyo (JP)

(72) Inventors: Toshihiro Yanagi, Tokyo (JP); Kei Tamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/942,279

(22) Filed: Jul. 29, 2020

(65) Prior Publication Data
US 2020/0359006 A1 Nov. 12, 2020

Related U.S. Application Data

(63) Continuation of application No. PCT/JP2018/030821, filed on Aug. 21, 2018.

(30) Foreign Application Priority Data

Jan. 31, 2018 (JP) ............................ JP2018-015944

(51) Int. Cl.
*H04N 13/344* (2018.01)
*H04N 13/366* (2018.01)
*G02B 27/01* (2006.01)

(52) U.S. Cl.
CPC ....... *H04N 13/344* (2018.05); *G02B 27/0172* (2013.01); *H04N 13/366* (2018.05);
(Continued)

(58) Field of Classification Search
CPC .. H04N 13/344; H04N 13/366; H04N 13/139; H04N 13/356; H04N 13/383;
(Continued)

(56) References Cited

U.S. PATENT DOCUMENTS

2015/0001373 A1 1/2015 Udo
2016/0063919 A1* 3/2016 Ha ........................ G06F 3/0346
                                                            345/156
(Continued)

FOREIGN PATENT DOCUMENTS

EP          2821837 A1   1/2015
JP      2015-011275 A    1/2015

OTHER PUBLICATIONS

International Search Report issued in connection with PCT/JP2018/030821, dated Nov. 13, 2018. (2 pages).

*Primary Examiner* — Nasim N Nirjhar
(74) *Attorney, Agent, or Firm* — K&L Gates LLP

(57) ABSTRACT

A display device to be disposed in front of eyes of a user includes a display unit having a right-eye region and a left-eye region, a detector configured to detect detection information enabling estimation of a direction of a line of sight of the user, a setting unit configured to set display region information indicating display regions of the right-eye and left-eye regions, and a controller configured to output the display region information and the detection information to a control device. After receiving an image including a right-eye image and a left-eye image corresponding to the display regions indicated by the display region information from the control device, the controller displays the received right-eye image in the display region of the right-eye region indicated by the display region information, and display the received left-eye image in the display region of the left-eye region indicated by the display region information.

13 Claims, 17 Drawing Sheets

(52) U.S. Cl.
CPC .......... *G02B 2027/0136* (2013.01); *G02B 2027/0178* (2013.01); *G02B 2027/0187* (2013.01)

(58) Field of Classification Search
CPC ........ G02B 27/0172; G02B 2027/0136; G02B 2027/0178; G02B 2027/0187; G02B 27/0093; G09G 5/00; G09G 5/36
See application file for complete search history.

(56) References Cited

U.S. PATENT DOCUMENTS

| | | | |
|---|---|---|---|
| 2017/0212717 A1* | 7/2017 | Zhang | G06F 3/1446 |
| 2017/0276956 A1* | 9/2017 | Morifuji | G02B 27/0093 |
| 2018/0003979 A1* | 1/2018 | Nakashima | G02B 27/017 |
| 2018/0270463 A1* | 9/2018 | Sou | H04N 13/117 |

* cited by examiner

DISPLAY DEVICE AND DISPLAY SYSTEM

CROSS-REFERENCE TO RELATED APPLICATIONS

This application claims the benefit of priority from Japanese Patent Application No. 2018-015944 filed on Jan. 31, 2018 and International Patent Application No. PCT/JP2018/030821 filed on Aug. 21, 2018, the entire contents of which are incorporated herein by reference.

BACKGROUND

1. Technical Field

What is disclosed herein relates to a display device and a display system.

2. Description of the Related Art

A virtual reality (VR) system stereoscopically displays a three-dimensional object and changes display of a stereoscopic image as a viewpoint moves, thereby causing a user to experience virtual reality. For example, Japanese Patent Application Laid-open Publication No. 2005-11275 discloses a stereoscopic image display system that generates a plurality of pieces of stereoscopic display data from coordinate data in accordance with viewpoint data.

However, when a personal computer displays the image of the virtual reality on a monitor, depending on the processing capacity of the personal computer, the personal computer may not be able to smoothly display the image of the virtual reality on the monitor, and thus, visibility may deteriorate.

SUMMARY

According to an aspect of the present disclosure, a display device to be disposed in front of both eyes of a user, the display device includes a display unit having a right-eye region and a left-eye region, a detector configured to detect detection information enabling estimation of a direction of a line of sight of the user, a setting unit configured to set display region information indicating display regions of the right-eye region and the left-eye region each of which displays an image that follows the direction of the line of sight of the user, and a controller configured to output the display region information of the setting unit and the detection information of the detector to a control device. The controller is configured to, after receiving an image including a right-eye image and a left-eye image corresponding to the display regions indicated by the display region information from the control device, display the received right-eye image in the display region of the right-eye region indicated by the display region information, and display the received left-eye image in the display region of the left-eye region indicated by the display region information.

According to another aspect of the present disclosure, a display system includes the display device described above and a control device configured to control display of an image on the display device. The control device comprises a second controller configured to output, to the display device, the image that follows the direction of the line of sight of the user and includes the right-eye image and the left-eye image corresponding to the display regions indicated by the display region information based on the detection information of the detector output by the display device.

DETAILED DESCRIPTION

Figure 1:
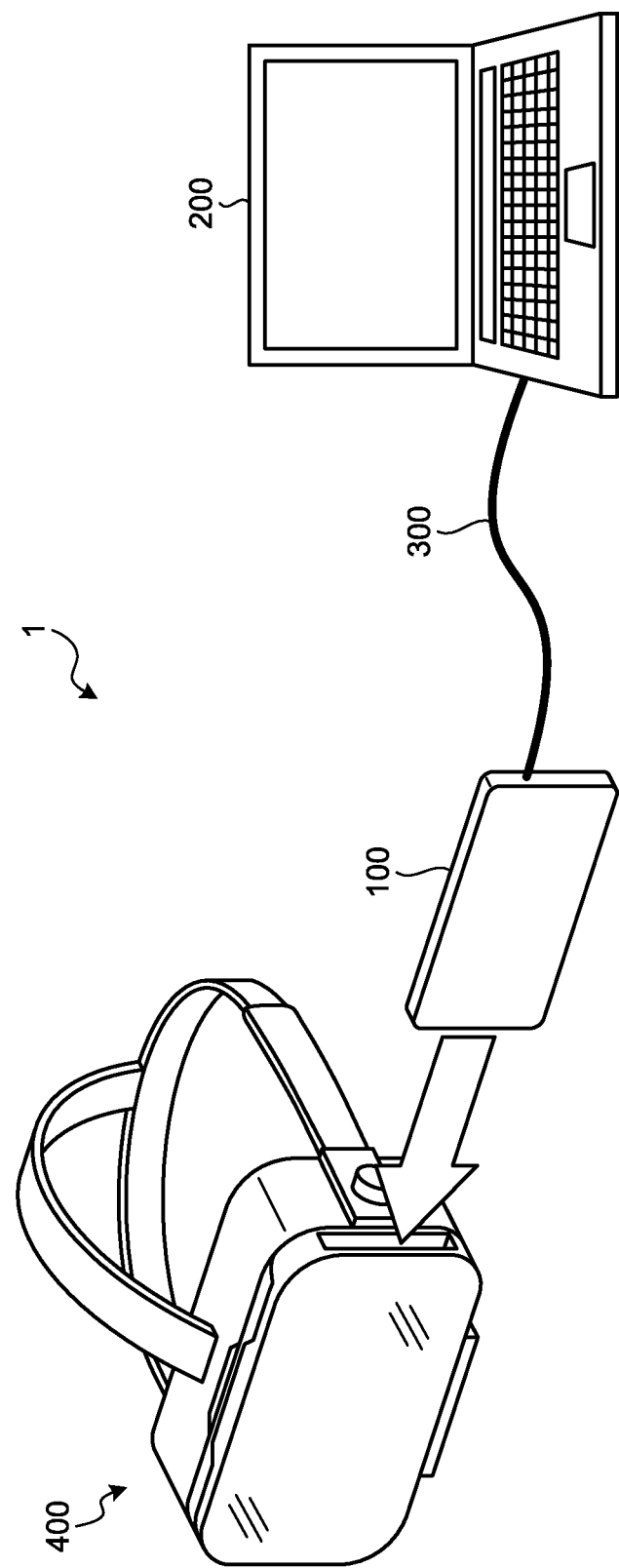
FIG. 1 is a configuration diagram illustrating an example of a display system according to a first embodiment of the present disclosure.

The following describes modes (embodiments) for carrying out the present disclosure in detail with reference to the drawings. The present disclosure is not limited to the description of the embodiments given below. Components described below include those easily conceivable by those skilled in the art or those substantially identical to the present disclosure. Furthermore, the components described below can be combined as appropriate. The disclosure is merely an example, and the present disclosure naturally encompasses appropriate modifications easily conceivable by those skilled in the art while maintaining the gist of the disclosure. To further clarify the description, widths, thicknesses, shapes, and the like of various parts may be schematically illustrated in the drawings as compared with actual aspects thereof. However, they are merely examples, and interpretation of the present disclosure is not limited thereto. The same component as that described with reference to an already mentioned drawing is denoted by the same reference numeral through the description and the drawings, and detailed description thereof may not be repeated where appropriate.

In this disclosure, when an element is described as being "on" another element, the element can be directly on the other element, or there can be one or more elements between the element and the other element.

First Embodiment

Figure 2:
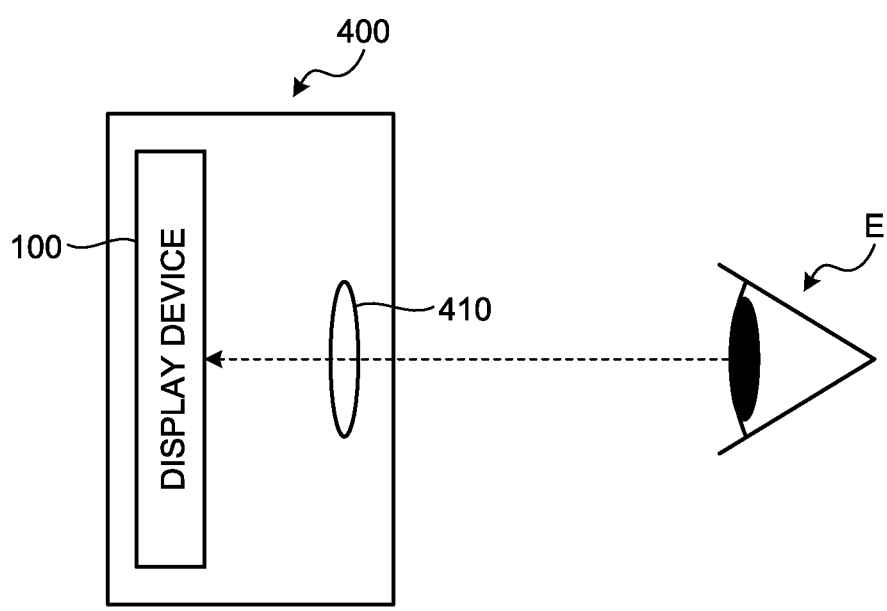
FIG. 2 is a schematic sectional view illustrating an example of a relative relation between a display device and an eye of a user.

FIG. 1 is a configuration diagram illustrating an example of a display system according to a first embodiment of the present disclosure. FIG. 2 is a schematic sectional view illustrating an example of a relative relation between a display device and an eye of a user.

In the present embodiment, a display system 1 is a display system that changes display as the user moves. The display system 1 is, for example, a VR system that stereoscopically displays a virtual reality (VR) image representing, for example, a three-dimensional object in a virtual space, and changes the stereoscopic display image as a line of sight of the user moves, thereby causing the user to experience the virtual reality. The display system 1 includes, for example, a display device 100 and a control device 200. The display device 100 and the control device 200 are configured to be capable of receiving and outputting information (signals) through a cable 300. Examples of the cable 300 include, but are not limited to, a Universal Serial Bus (USB) cable and a High-Definition Multimedia Interface (HDMI) (registered trademark) cable. The display device 100 and the control device 200 may be configured to be capable of receiving and outputting the information through wireless communication.

A subject to be displayed by the display system 1 is not limited to the VR image, and may be, for example, an augmented reality (AR) image or a mixed reality (MR) image. In other words, the subject to be displayed by the display system 1 only needs to be an image that can correspond to two or more viewpoints of the user. The display device 100 may be supplied with power from the control device 200 through the cable 300. For example, the display device 100 may include a power receiver supplied with the power from a power supply of the control device 200 through the cable 300 so as to use the power supplied from the control device 200 to drive components, for example, a display unit 110 and a detector 120 of the display device 100. This configuration can eliminate, for example, a battery from the display device 100, and can provide the display device 100 having a smaller weight at a lower cost.

The display device 100 includes a display panel. Examples of the display panel include, but are not limited to, display devices, such as a liquid crystal display, an organic electroluminescent (EL) panel, a micro-light-emitting diode (µLED) panel, and a mini-LED panel. The display device 100 is fixed to a wearable member 400. Examples of the wearable member 400 include, but are not limited to, a headset, goggles, and a helmet and mask covering both eyes of the user. The wearable member 400 is worn on the head on the user. When being worn, the wearable member 400 is disposed in front of the user so as to cover both eyes of the user. The wearable member 400 positions the internally fixed display device 100 in front of both eyes of the user so as to serve as an immersive wearable member. The wearable member 400 may include an output unit for outputting, for example, a sound signal output from the control device 200. The example depicted in FIG. 1 illustrates a case where the display device 100 is slotted into the wearable member 400. The display device 100, however, may be fixed to the wearable member 400. In other words, the display system may be constituted by a wearable display device including the wearable member 400 and the display device 100, and the control device 200.

As illustrated in FIG. 2, the wearable member 400 includes, for example, lenses 410 corresponding to both eyes of the user. Examples of the lenses 410 include, but are not limited to, magnifying lenses. When being worn on the head of the user, the wearable member 400 positions the lenses 410 in front of eyes E of the user. The user views the display device 100 magnified by the lenses 410. Therefore, the display device 100 preferably clearly displays an image (screen). In the present disclosure, the case has been described where the wearable member 400 includes one pair of the lenses. The wearable member 400, however, may include a plurality of pairs of lenses, and the display device 100 may be disposed in a position different from the front of the eyes, for example.

The control device 200 displays, for example, the image of the virtual reality or the like on the display device 100. For example, an electronic apparatus, such as a personal computer or game equipment can be used as the control device 200. Examples of the image of the virtual reality include, but are not limited to, images such as a computer graphic video and a 360-degree live action video. The control device 200 outputs a three-dimensional image obtained using parallax between both eyes of the user to the display device 100. The control device 200 outputs an image for each of the right eye and the left eye that follows a direction of the line of sight of the user to the display device 100.

Figure 3:
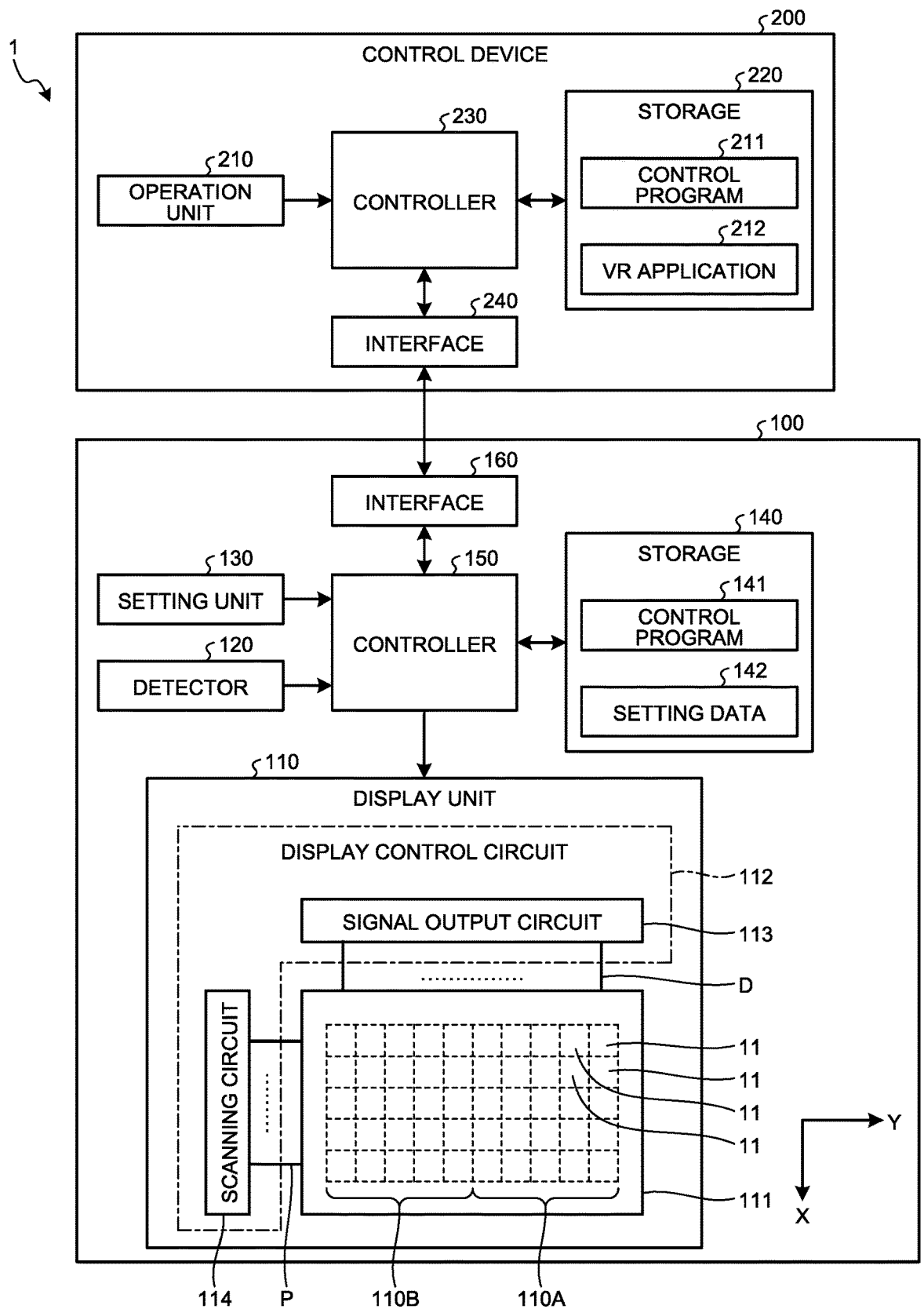
FIG. 3 is a block diagram illustrating an example of a configuration of the display system according to the first embodiment.

FIG. 3 is a block diagram illustrating an example of a configuration of the display system according to the first embodiment. As illustrated in FIG. 3, the display device 100 includes the display unit 110, the detector 120, a setting unit 130, a storage 140, a controller 150, and an interface 160. In the present embodiment, an example of a case will be described where the display device 100 is a liquid crystal display.

The display unit 110 includes a display panel 111 and a display control circuit 112. The display unit 110 includes a light source device (not illustrated) that irradiates the display panel 111 from behind.

In the display panel 111, $P_0 \times Q_0$ pixels 11 ($P_0$ pixels in a row direction and $Q_0$ pixels in a column direction) are arranged in a two-dimensional matrix (in a row-column configuration). The example depicted in FIG. 3 illustrates an example in which the pixels 11 are arranged in a matrix in a two-dimensional XY-coordinate system. In this example, the row direction corresponds to an X-direction (first direction), and the column direction corresponds to a Y-direction (second direction). In the present embodiment, $P_0=1700$, and $Q_0=2880$.

The display panel 111 includes signal lines extending in the X-direction and scanning lines extending in the Y-direction intersecting the X-direction. The display panel 111 includes, for example, the 2880 signal lines arranged in the Y-direction and the 1700 scanning lines arranged in the X-direction intersecting the Y-direction. In the display panel 111, the pixels 11 are disposed at respective intersecting points between the signal lines and the scanning lines. Each of the pixels 11 includes a switching element (thin-film transistor (TFT)) coupled to one of the signal lines and one of the scanning lines, and includes a pixel electrode coupled to the switching element. Each of the scanning lines is coupled to a plurality of the pixels 11 arranged along the extending direction of the scanning line. Each of the signal lines is coupled to a plurality of the pixels 11 arranged along the extending direction of the signal line.

The display panel 111 has a right-eye region 110A and a left-eye region 110B. The right-eye region 110A is, for example, a region in a right half of a display surface of the display panel 111 capable of displaying an image. The left-eye region 110B is, for example, a region in a left half of the display surface of the display panel 111 capable of displaying an image. In the first embodiment, a case will be described where the display unit 110 includes the one display panel 111. The display unit 110 is, however, not limited to this case. The display unit 110 may be implemented, for example, by two panels: a panel for the right eye and a panel for the left eye.

The display control circuit 112 includes a signal output circuit 113 and a scanning circuit 114. The signal output circuit 113 is electrically coupled to signal lines D of the display panel 111. The display control circuit 112 causes the scanning circuit 114 to control on and off of the switching element (for example, the TFT) for controlling operation (light transmittance) of the pixel 11 in the display panel 111. The scanning circuit 114 is electrically coupled to scanning lines P of the display panel 111.

The detector 120 detects information enabling estimation of the direction of the line of sight of the user. For example, the detector 120 detects information indicating a movement of the display device 100, and the display system 1 estimates the direction of the line of sight of the user wearing the display device 100 on the head based on the information indicating the movement of the display device 100. The detector 120 uses, for example, at least one of an angle, acceleration, an angular velocity, an azimuth, and a distance of the display device 100 to detect the information enabling the estimation of the direction of the line of sight. The detector 120 can use, for example, a gyro sensor, an acceleration sensor, an azimuth sensor, or the like. The detector 120 may use, for example, the gyro sensor to detect the angle and the angular velocity of the display device 100. The detector 120 may use, for example, the acceleration sensor to detect the acceleration acting on the display device 100. The detector 120 may use, for example, the azimuth sensor to detect the azimuth of the display device 100. The detector 120 may use, for example, a distance sensor, a Global Positioning System (GPS) receiver, or the like to detect the movement of the display device 100. The detector 120 may use another sensor, such as a photosensor, or a combination of a plurality of sensors as long as the sensor is usable for detecting, for example, the direction of the line of sight of the user, a change in the line of sight, or the movement of the user. The detector 120 is electrically coupled to the controller 150. The detector 120 outputs detection information indicating the detected detection result to the controller 150.

The setting unit 130 allows the user to set display regions of the right-eye region 110A and the left-eye region 110B for displaying the image that follows the direction of the line of sight of the user. The setting unit 130 receives, for example, information indicating a selection by the user of a first mode or a second mode (to be described later). For example, a dual in-line package (DIP) switch, a toggle switch, a slide switch, or the like can be used as the setting unit 130. The setting unit 130 is electrically coupled to the controller 150. The setting unit 130 outputs set values that have been set, for example, display region information to the controller 150.

The storage 140 stores a computer program and data. The storage 140 temporarily stores processing results of the controller 150. The storage 140 includes a storage medium. Examples of the storage medium include, but are not limited to, a read-only memory (ROM), a random access memory (RAM), a memory card, an optical disc, and a magneto-optical disk.

The storage 140 stores, for example, a control program 141, setting data 142, and the like. The control program 141 can provide, for example, functions related to various types of control for operating the display device 100. The control program 141 can provide, for example, functions for outputting the information on the display regions set through the setting unit 130 and the detection result of the detector 120 to the control device 200. The control program 141 can provide a function for controlling the display of the display unit 110. The setting data 142 includes, for example, information on various settings related to the operation of the display device 100. The storage 140 can store the information detected by the detector 120.

Examples of the controller 150 include, but are not limited to, a microcontroller unit (MCU) and a central processing unit (CPU). The controller 150 is electrically coupled to the display control circuit 112 of the display unit 110, the storage 140, and the interface 160. The controller 150 executes the control program 141 to control, for example, the display unit 110 and the interface 160. The controller 150 outputs, to the display control circuit 112, signals representing the image that have been received from the control device 200.

The interface 160 includes a connector to be coupled to the cable 300 coupled to the control device 200. The interface 160 receives the signals from the control device 200 through the coupled cable 300. The interface 160 outputs signals received from the controller 150 to the control device 200 through the cable 300. The interface 160 may be, for example, a wireless communication device, and may transmit and receive information to and from the control device 200 through wireless communication.

The control device 200 includes an operation unit 210, storage 220, a controller (second controller) 230, and an interface 240.

The operation unit 210 receives an operation of the user. For example, input devices, such as a keyboard, buttons, and a touchscreen can be used as the operation unit 210. The operation unit 210 is electrically coupled to the controller 230. The operation unit 210 outputs information corresponding to the operation to the controller 230.

The storage 220 stores a computer program and data. The storage 220 temporarily stores processing results of the controller 230. The storage 220 includes a storage medium. Examples of the storage medium include, but are not limited to, a ROM, a RAM, a memory card, an optical disc, and a magneto-optical disk. The storage 220 may store data of the image to be displayed on the display device 100.

The storage 220 stores, for example, a control program 211, a VR application 212, and the like. The control program 211 can provide, for example, functions related to various types of control for operating the control device 200. The VR application 212 can provide a function for displaying the image of the virtual reality on the display device 100. The storage 220 can store, for example, various types of information received from the display device 100, including, for example, data representing the detection result of the detector 120.

Examples of the controller 230 include, but are not limited to, an MCU and a CPU. The controller 230 can integrally control the operation of the control device 200. Various functions of the controller 230 are performed based on the control by the controller 230.

The controller 230 includes, for example, a graphics processing unit (GPU) for generating the image to be displayed. The GPU generates the image to be displayed on the display device 100. The controller 230 outputs the image generated by the GPU to the display device 100 through the interface 240. In the present embodiment, although a case will be described where the controller 230 of the control device 200 includes the GPU, the present disclosure is not limited to this case. For example, the GPU may be provided in the display device 100 or the controller 150 of the display device 100. In that case, the display device 100 may acquire data from, for example, the control device 200 or an external electronic apparatus, and the GPU may generate an image based on the data.

The interface 240 includes a connector to be coupled to the cable 300 coupled to the display device 100. The interface 240 receives the signals from the display device 100 through the coupled cable 300. The interface 240 outputs signals received from the controller 230 to the display device 100 through the cable 300. The interface 240 may be, for example, a wireless communication device, and may transmit and receive information to and from the display device 100 through wireless communication.

The controller 230 executes the VR application 212, and displays an image in response to the movement of the user (display device 100) on the display device 100. While the image is displayed on the display device 100, when the controller 230 has detected a change in the user (display device 100), the controller 230 changes the image displayed on the display device 100 to an image in a direction of the change. When the controller 230 starts to create the image, the controller 230 creates the image based on a reference viewpoint and a reference line of sight in the virtual space. When the controller 230 has detected the change in the user (display device 100), the controller 230 changes the viewpoint or the line of sight at the time of creating the displayed image from the reference viewpoint or the reference line-of-sight direction depending on the movement of the user (display device 100), and displays an image based on the changed viewpoint or the changed line of sight on the display device 100.

For example, the controller 230 detects a rightward movement of the line of sight of the user based on the detection result of the detector 120 received from the display device 100. In this case, the controller 230 changes the image from the currently displayed image to an image obtained when the line of sight is changed rightward. The user can view the image in the rightward direction of the image displayed on the display device 100.

For example, when the controller 230 has detected a movement of the display device 100 based on the detection result of the detector 120 received from the display device 100, the controller 230 changes the image in response to the detected movement. When the controller 230 has detected that the display device 100 has moved forward, the controller 230 changes the image to an image obtained when the currently displayed image has moved forward. When the controller 230 has detected that the display device 100 has moved backward, the controller 230 changes the image to an image obtained when the currently displayed image has moved backward. The user can view the image changed in the direction of movement of the user from the image displayed on the display device 100.

Figure 4:
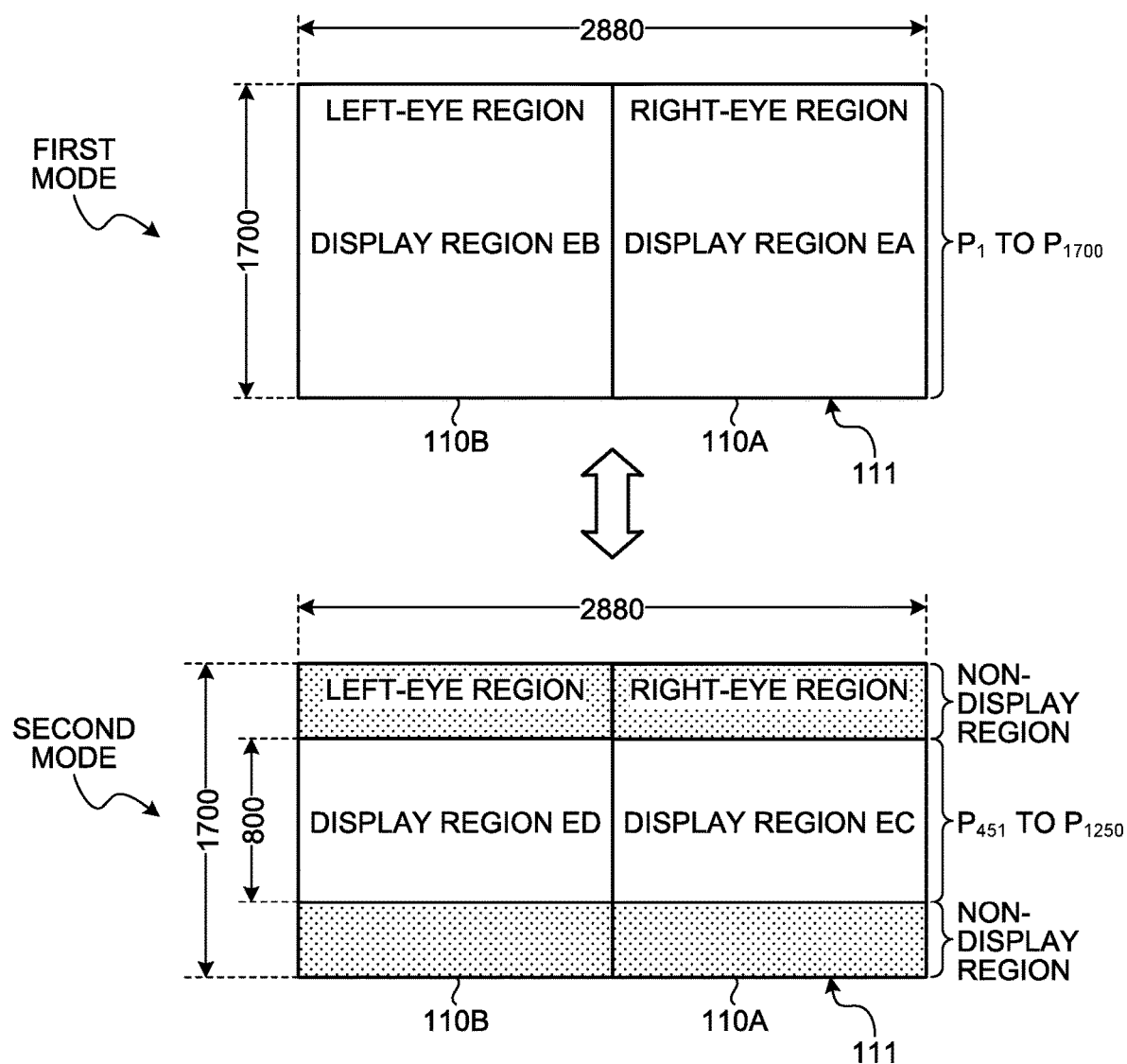
FIG. 4 is a diagram illustrating an example of display modes of the display device according to the first embodiment.

The following describes a relation of the right-eye region 110A and the left-eye region 110B with settable modes in the display unit 110 of the display device 100 according to the first embodiment. FIG. 4 is a diagram illustrating an example of the display modes of the display device 100 according to the first embodiment.

In the example illustrated in FIG. 4, the pixels 11 are arranged in a matrix of 2880×1700 pixels in the display panel 111. In this case, the display panel 111 includes 1700 scanning lines $P_1$ to $P_{1700}$. The scanning lines $P_1$ to $P_{1700}$ are provided over the right-eye region 110A and the left-eye region 110B.

The display device 100 includes the first mode and the second mode. The first mode and the second mode are set through the setting unit 130. The first mode and the second mode can be set, for example, based on the processing capacity of the control device 200 that is used by the user. The information indicating the set mode can be stored as the setting data 142.

The first mode is a mode of setting the entire right-eye region 110A and the entire left-eye region 110B as the display regions. In the first mode, all the 1700 scanning lines $P_1$ to $P_{1700}$ are set as effective scanning lines. When the first mode is set, the display device 100 sets the entire region of the right-eye region 110A corresponding to the scanning lines $P_1$ to $P_{1700}$ as a display region EA, and sets the entire region of the left-eye region 110B corresponding to the scanning lines $P_1$ to $P_{1700}$ as a display region EB.

The second mode is a mode of setting a portion of the right-eye region 110A and a portion of the left-eye region 110B as the display regions smaller than those in the first mode. In the second mode, some of the scanning lines fewer than those in the first mode, for example, the 800 scanning lines $P_{451}$ to $P_{1250}$ of the 1700 scanning lines are set as the effective scanning lines. In the second mode, the scanning lines $P_1$ to $P_{450}$ and $P_{1251}$ to $P_{1700}$ are set as ineffective scanning lines. When the second mode is set, the display device 100 sets a partial region of the right-eye region 110A corresponding to the scanning lines $P_{451}$ to $P_{1250}$ as a display region EC, and sets a partial region of the left-eye region 110B corresponding to the scanning lines $P_{451}$ to $P_{1250}$ as a display region ED.

When the first mode is set through the setting unit 130, the controller 150 of the display device 100 outputs the display region information indicating the display region EA of the right-eye region 110A and the display region EB of the left-eye region 110B to the control device 200 through the interface 160. When the first mode is set, the display region information serves as information indicating the display regions in which all the scanning lines of the display panel 111 are effective. In this case, for example, Extended Display Identification Data (EDID) corresponding to the display panel 111 may be used as the display region information.

When the second mode is set through the setting unit 130, the controller 150 of the display device 100 outputs the display region information indicating the display region EC as a portion of the right-eye region 110A and the display region ED as a portion of the left-eye region 110B to the control device 200 through the interface 160. When the second mode is set, the display region information serves as information indicating the display regions in which some of the scanning lines of the display panel 111 are effective. That is, the controller 150 outputs the display region information for reducing the display performance of the display panel 111 to the control device 200.

Figure 5:
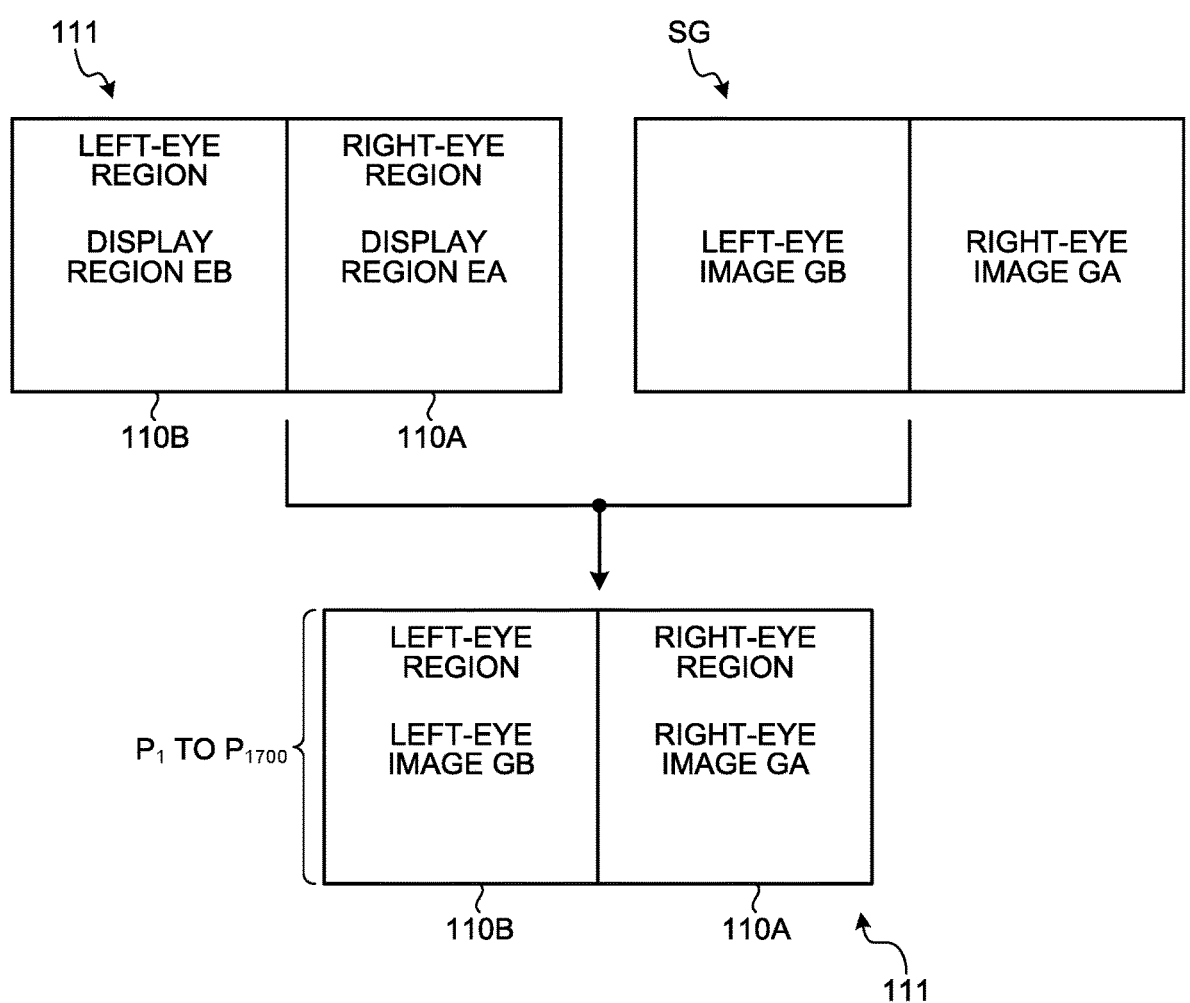
FIG. 5 is a diagram illustrating an example of display control of the display system according to the first embodiment.
Figure 6:
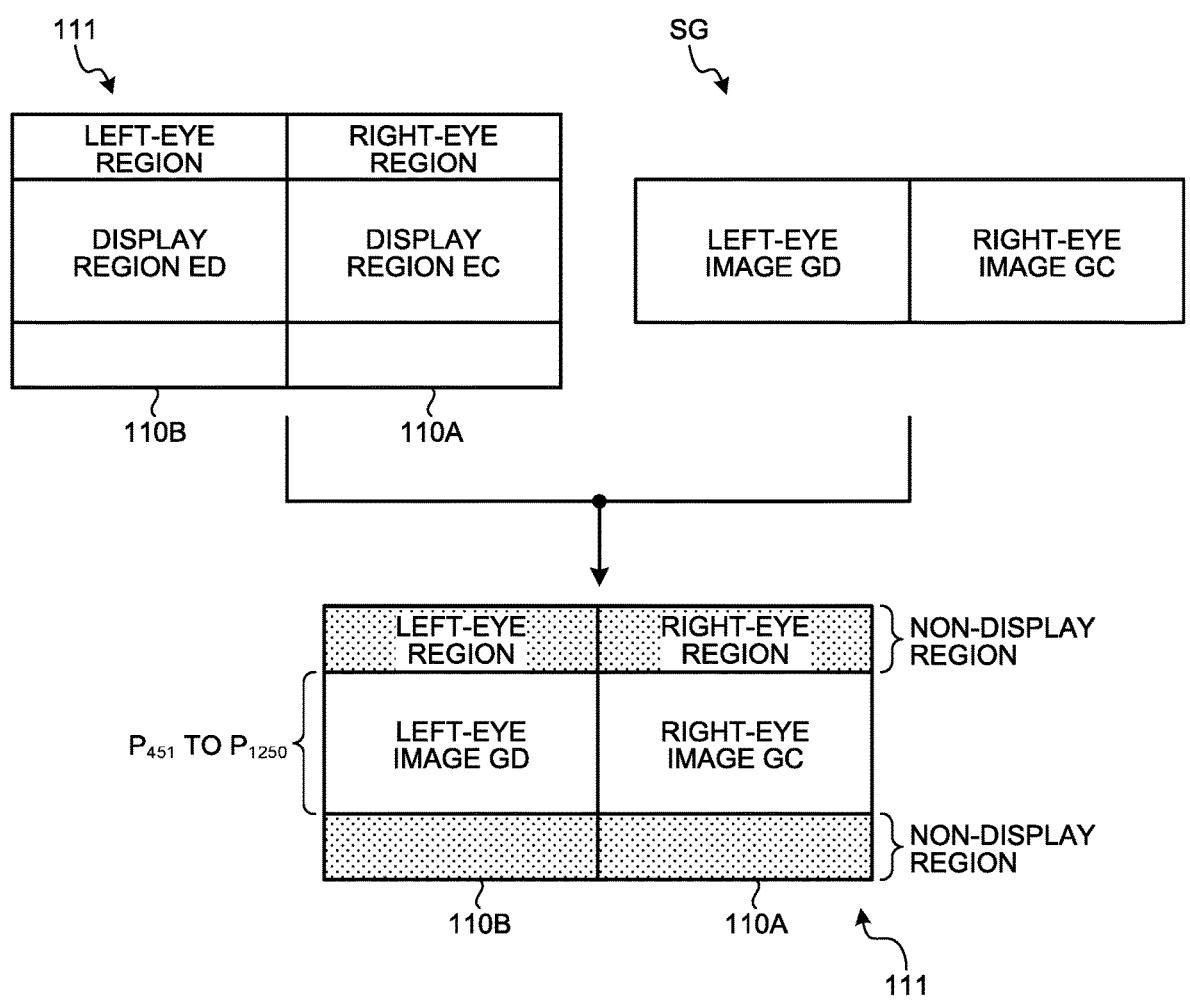
FIG. 6 is a diagram illustrating another example of the display control of the display system according to the first embodiment.

The following describes an example of display control of the display system 1 according to the first embodiment. FIG. 5 is a diagram illustrating the example of the display control of the display system 1 according to the first embodiment. FIG. 6 is a diagram illustrating another example of the display control of the display system 1 according to the first embodiment.

In the example illustrated in FIG. 5, the display device 100 is set to the first mode through the setting unit 130. In this case, the entire region of the right-eye region 110A of the display panel 111 serves as the display region EA, and the entire region of the left-eye region 110B of the display panel 111 serves as the display region EB.

The control device 200 receives the display region information indicating the display region EA of the right-eye region 110A and the display region EB of the left-eye region 110B from the display device 100 through the interface 240. The control device 200 determines the size of an image to be output to the display device 100 based on the display region information. The display region information includes, for example, information indicating the resolution of the display panel 111. The resolution includes a pixel resolution representing a density of the pixels in the display regions of the image and an image resolution representing the number of pixels in the display regions of the image. The control device 200 outputs a signal SG representing a right-eye image GA and a left-eye image GB to the display device 100, the right-eye and left-eye images GA and GB corresponding to the display regions EA and EB of the display device 100 and obtained using the parallax between both eyes of the user. The control device 200 determines the size of the image by, for example, multiplying the image resolution included in the display region information by the pixel resolution. As illustrated in FIG. 5, the image resolution included in the display region information is the number of pixels corresponding to the entire region of the display device 100. Therefore, the control device 200 determines the entire region of the display device 100 to be the size of the image, and outputs the signal SG corresponding to the determined size of the image to the display device 100. The signal SG illustrated in FIG. 5 represents, for example, a signal for images of one frame. In this example, the pixel resolution corresponds to the density of the pixels per unit area of the display device 100.

After receiving the signal SG from the control device 200, the display device 100 causes the scanning circuit 114 to sequentially scan the scanning lines $P_1$ to $P_{1700}$ to display the images represented by the signal SG on the entire surface of the display panel 111. The display device 100 displays the right-eye image GA of the signal SG in the display region EA of the right-eye region 110A, and displays the left-eye image GB of the signal SG in the display region EB of the left-eye region 110B. As a result, the user can stereoscopically view an image by viewing the right-eye image GA and the left-eye image GB displayed on the display device 100.

In the example illustrated in FIG. 6, the display device 100 is set to the second mode through the setting unit 130. In this case, the partial region of the right-eye region 110A of the display panel 111 serves as the display region EC, and the partial region of the left-eye region 110B of the display panel 111 serves as the display region ED.

The control device 200 receives, from the display device 100 through the interface 240, the display region information indicating the display region EC of the right-eye region 110A and the display region ED of the left-eye region 110B. The control device 200 determines the size of the image to be output to the display device 100 based on the display region information. The control device 200 outputs the signal SG representing a right-eye image GC and a left-eye image GD to the display device 100, the right-eye and left-eye images GC and GD corresponding to the display regions EC and ED of the display device 100 and obtained using the parallax between both eyes of the user. For example, in the second mode, the image resolution included in the display region information is the number of pixels corresponding to a partial region of the display device 100, and therefore, is less than the image resolution in the first mode. Accordingly, in FIG. 6, the control device 200 outputs, to the display device 100, the signal SG corresponding to the partial region of the display device 100 based on the display region information including an image resolution less than that of the first mode. The right-eye image GC and the left-eye image GD are images smaller than the right-eye image GA and the left-eye image GB illustrated in FIG. 5. In the present embodiment, the pixel resolution included in the display region information in the first mode is the same as the pixel resolution included in the display region information in the second mode. Therefore, the density of the pixels (pixel resolution) per unit area of the image of the signal SG in the first mode is the same as that of the image of the signal SG in the second mode. The pixel resolution in the second mode may be greater than the pixel resolution in the first mode.

The signal SG illustrated in FIG. 6 represents the signal for images of one frame. The size of the images represented by the signal SG is smaller than that of the images represented by the signal SG illustrated in FIG. 5. That is, the control device 200 can cause the size of the images to be processed to be smaller in the case where the display device 100 is set to the second mode than in the case where the display device 100 is set to the first mode. As a result, the processing load can be reduced in the control device 200.

After receiving the signal SG from the control device 200, the display device 100 causes the scanning circuit 114 to sequentially scan the scanning lines $P_{451}$ to $P_{1250}$ to display the images represented by the signal SG in the partial region of the display panel 111. The display device 100 displays the right-eye image GC of the signal SG in the display region EC of the right-eye region 110A, and displays the left-eye image GD of the signal SG in the display region ED of the left-eye region 110B. The display device 100 collectively scans the scanning lines corresponding to non-display regions of the display panel 111 to display the non-display regions in, for example, black or gray. As a result, the user can view a stereoscopic image as if peeping at the image by viewing the right-eye image GC and the left-eye image GD displayed on the display device 100.

The display device 100 outputs the display region information indicating the display regions of the right-eye region 110A and the left-eye region 110B of the display unit 110 set by the user and the detection result of the detector 120 to the control device 200, and thus, can cause the display device 100 to output the image suitable for the processing capacity of the control device 200. As a result, the display system 1 can output the image depending on the processing capacity of the control device 200 so as to be capable of smoothly display the image of the virtual reality on the display unit 110 even if the line of sight of the user moves. Consequently, the display device 100 and the display system 1 including the display device 100 can restrain reduction in visibility of the image displayed in each of the left-eye region 110B and the right-eye region 110A of the display panel 111.

In the case of the present disclosure, since the display system 1 changes the number of pixels while keeping the density of the pixels, fineness of the image can be maintained although the display area changes.

For example, the image resolution of general display panels is 2.07 million (1920×1080) pixels in the case of full high-definition (FHD) panels. In contrast, the display panel 111 used for VR has an image resolution of 4.9 million (2880×1700) pixels, which is approximately 2.36 times that of the general display panels. When a GPU, which is capable of generating 90 images per second at the image resolution of FHD, tries to generate an image having the image resolution equal to the image resolution of a panel used for VR or the like, the number of pixels is approximately 2.36 times that of the FHD panels. As a result, the load of the GPU of the control device 200 is also 2.36 times that of the FHD panels, so that only 38 images per second can be generated. In that case, during moving image display of 38 images per second, drop frame or screen tearing occurs, so that the images cannot be smoothly displayed.

In the display system 1 according to the first embodiment, when the display device 100 is in the first mode, the control device 200 generates an image having 4.9 million (2880×1700) pixels. When the display device 100 is in the second mode, the control device 200 generates an image having 2.3 million (2880×800) pixels.

For example, a case will be described where the control device 200 uses a GPU capable of generating 90 images per second (90 frames per second (fps)) at an image resolution of 1920×1080. When the display device 100 is in the first mode, the control device 200 generates 38 images each having 4.9 million pixels in each second. When the display device 100 is in the second mode, the control device 200 generates 81 images each having 2.3 million pixels in each second. In this case, the display system 1 cannot perform the smooth display because the drop frame or the screen tearing occurs in the first mode, but can perform the smooth display without causing the drop frame or the screen tearing in the second mode. Therefore, the display system 1 can allow the user to view the smooth display by allowing the user to set the display device 100 to the second mode depending on the graphic performance of the control device 200.

By having the first mode and the second mode, the display device 100 can allow the user to easily set the display regions of the right-eye region 110A and the left-eye region 110B through the setting unit 130. As a result, the display device 100 can improve operability.

When the display device 100 is set to the second mode, regions including some of the effective scanning lines in the plurality of scanning lines are handled as the display regions, and regions including scanning lines different from the some of the effective scanning lines are handled as the non-display regions. As a result, the display device 100 can collectively display the non-display regions, and thus can improve the processing efficiency.

Figure 7:
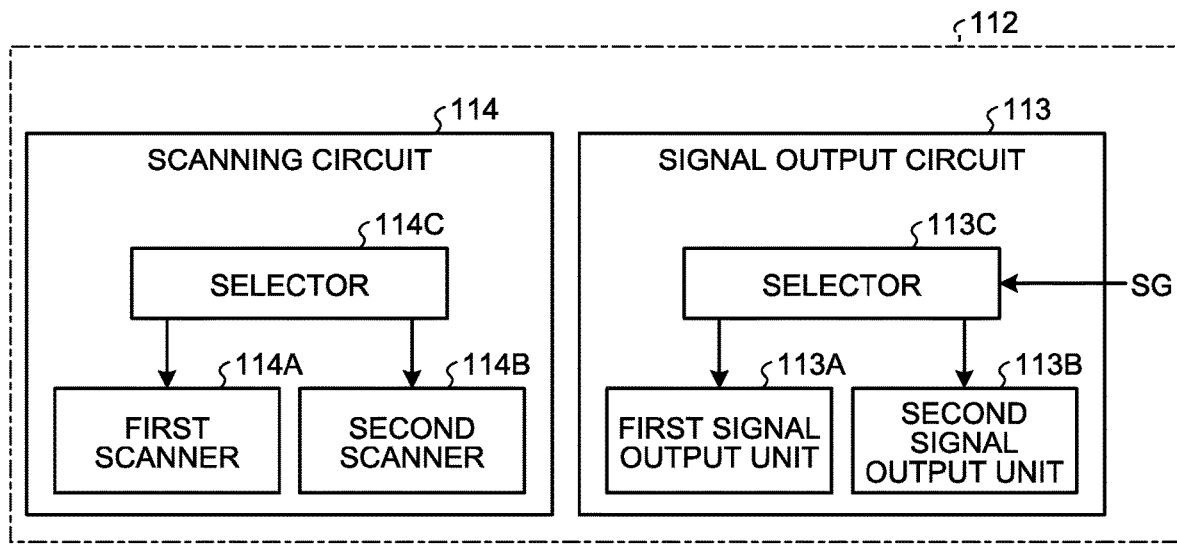
FIG. 7 is a block diagram illustrating an example of a signal output circuit and a scanning circuit according to the first embodiment.

The following describes an example of operation of the display unit 110 of the display device 100 according to the first embodiment. FIG. 7 is a block diagram illustrating an example of the signal output circuit 113 and the scanning circuit 114 according to the first embodiment.

As illustrated in FIG. 7, the signal output circuit 113 includes a first signal output unit 113A, a second signal output unit 113B, and a selector 113C.

In the case where the first mode is set, after receiving the signal SG from the controller 150, the first signal output unit 113A outputs display signals of the signal SG corresponding to a plurality of pixels coupled to one of the scanning lines to the respective signal lines in each scanning period. The signal SG received by the first signal output unit 113A includes the display signals corresponding to a plurality of pixels coupled to each of the scanning lines $P_1$ to $P_{1700}$. That is, the first signal output unit 113A outputs the display signals of the signal SG as they are to the respective signal lines.

In the case where the second mode is set, after receiving the signal SG from the controller 150, the second signal output unit 113B outputs the signal SG corresponding to a plurality of pixels coupled to one of the scanning lines to the respective signal lines in each scanning period. The signal SG received by the second signal output unit 113B includes only display signals corresponding to a plurality of pixels coupled to each of the scanning lines $P_{451}$ to $P_{1250}$. The second signal output unit 113B outputs the display signals to the respective signal lines for a plurality of pixels coupled to the scanning lines $P_{451}$ to $P_{1250}$. The second signal output unit 113B outputs non-display signals to the respective signal lines for a plurality of pixels coupled to the scanning lines $P_1$ to $P_{450}$ and $P_{1251}$ to $P_{1700}$.

The selector 113C selects an output destination of the signal SG received from the controller 150 based on the mode set through the setting unit 130. When the first mode is set, the selector 113C outputs the signal SG received from the controller 150 to the first signal output unit 113A. When the second mode is set, the selector 113C outputs the signal SG received from the controller 150 to the second signal output unit 113B.

The scanning circuit 114 includes a first scanner 114A, a second scanner 114B, and a selector 114C.

When the first mode is set, the first scanner 114A sequentially applies a scanning signal to each of the scanning lines corresponding to correspond to the first signal output unit 113A in each scanning period. In the case where the second mode is set, the second scanner 114B sequentially applies the scanning signals to predetermined scanning lines and collectively applies the scanning signals to scanning lines different from the predetermined scanning lines corresponding to correspond to the second signal output unit 113B. The predetermined scanning lines refer to scanning lines corresponding to the display regions in the second mode. The scanning lines different from the predetermined scanning lines refer to scanning lines corresponding to the non-display regions in the second mode. The scanning signal refers to a signal that drives switch elements included in the pixels to transmit the signals from the signal lines to the pixels.

The selector 114C selects a scanner to be driven based on the mode set through the setting unit 130. When the first mode is set, the selector 114C selects the first scanner 114A. When the second mode is set, the selector 114C selects the second scanner 114B.

Figure 8:
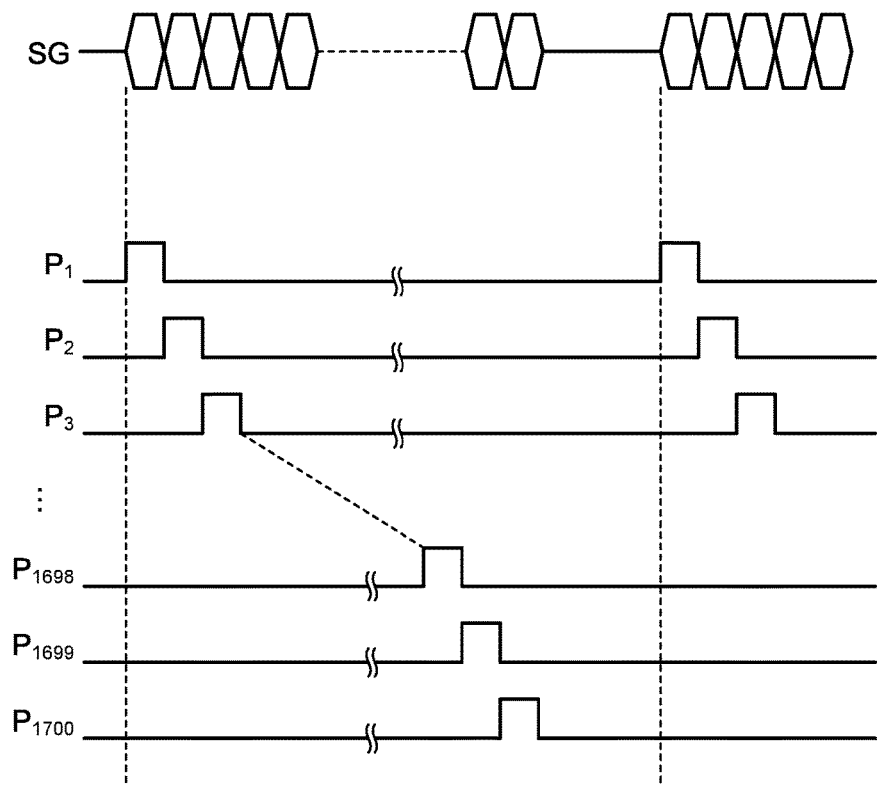
FIG. 8 is a waveform diagram illustrating a control example of a display unit when the display device according to the first embodiment is in a first mode.

FIG. 8 is a waveform diagram illustrating a control example of the display unit when the display device 100 according to the first embodiment is in the first mode.

When the display device 100 is set to the first mode, the signal output circuit 113 receives the signal SG corresponding to the pixels coupled to the respective scanning lines $P_1$ to $P_{1700}$ illustrated in FIG. 8. In this case, the selector 113C outputs the received signal SG to the first signal output unit 113A. The first signal output unit 113A sequentially outputs the display signals of the signal SG corresponding to a plurality of pixels coupled to one of the scanning lines to the respective signal lines in each scanning period. The selector 114C of the scanning circuit 114 selects the first scanner 114A, and the first scanner 114A sequentially applies a gate pulse serving as the scanning signal to each of the scanning lines $P_1$ to $P_{1700}$ in each scanning period.

As a result, as illustrated in FIG. 5, the display panel 111 displays the right-eye image GA of the signal SG in the display region EA of the right-eye region 110A, and displays the left-eye image GB of the signal SG in the display region EB of the left-eye region 110B.

Figure 9:
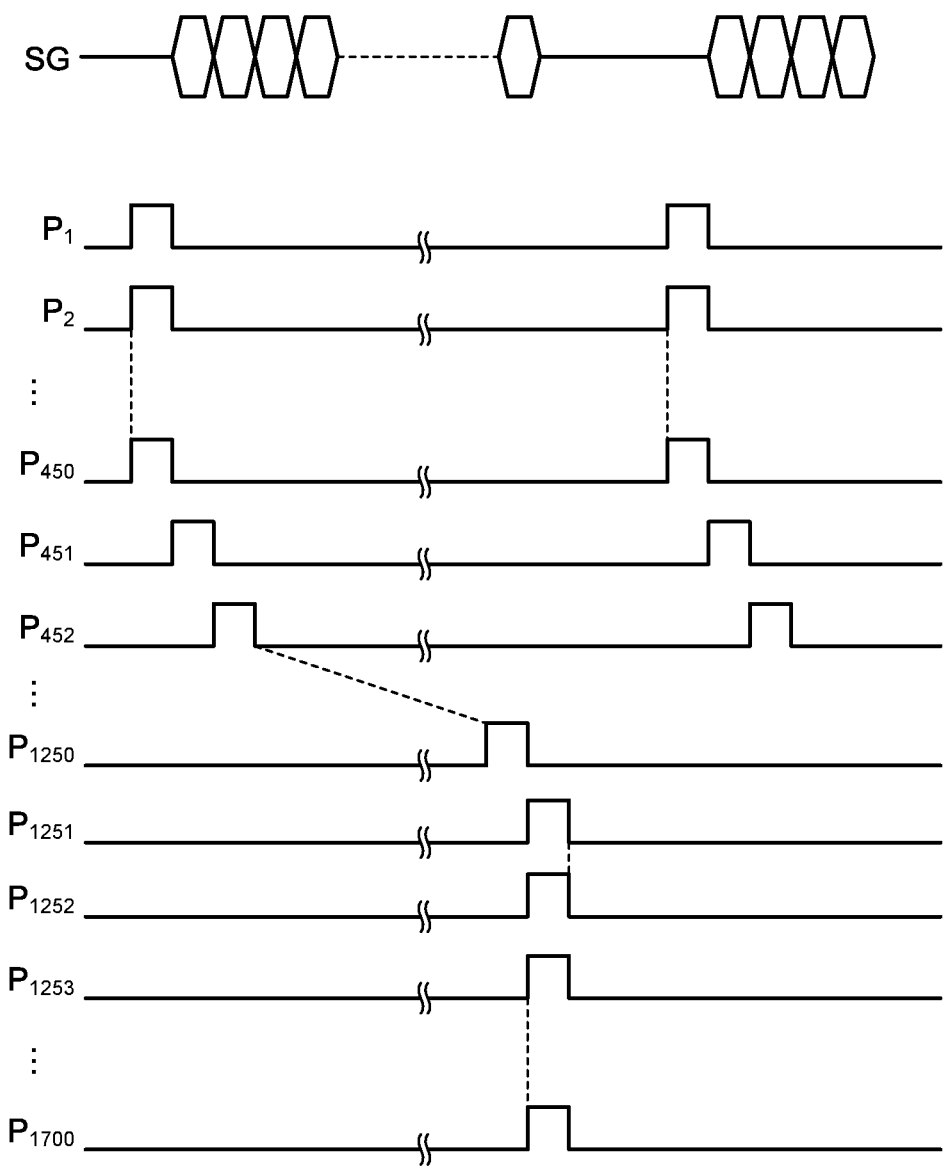
FIG. 9 is a waveform diagram illustrating a control example of the display unit when the display device according to the first embodiment is in a second mode.

FIG. 9 is a waveform diagram illustrating a control example of the display unit 110 when the display device 100 according to the first embodiment is in the second mode.

When the display device 100 is set to the second mode, the signal output circuit 113 receives the signal SG corresponding to the scanning lines $P_{451}$ to $P_{1250}$ illustrated in FIG. 9. In this case, the selector 113C outputs the received signal SG to the second signal output unit 113B.

The second signal output unit 113B of the signal output circuit 113 outputs the non-display signals to the signal lines corresponding to a plurality of pixels coupled to the scanning lines $P_1$ to $P_{450}$ in each scanning period. The selector 114C of the scanning circuit 114 selects the second scanner 114B, and the second scanner 114B collectively scans the scanning lines $P_1$ to $P_{450}$.

The second signal output unit 113B sequentially outputs the display signals of the signal SG corresponding to a plurality of pixels coupled to one of the scanning lines to the respective signal lines in each scanning period. The second scanner 114B of the scanning circuit 114 sequentially applies the scanning signals to the scanning lines $P_{451}$ to $P_{1250}$.

The second signal output unit 113B outputs the non-display signals to the respective signal lines corresponding to the pixels coupled to the scanning lines $P_{1251}$ to $P_{1700}$ in each scanning period. The second scanner 114B of the scanning circuit 114 collectively scans the scanning lines $P_{1251}$ to $P_{1700}$.

As a result, as illustrated in FIG. 6, the display panel 111 displays the right-eye image GC of the signal SG in the display region EC in the portion of the right-eye region 110A, and displays the left-eye image GD of the signal SG in the display region ED in the portion of the left-eye region 110B. The display panel 111 displays the non-display regions not displaying any image of the signal SG in, for example, black or gray.

Figure 10:
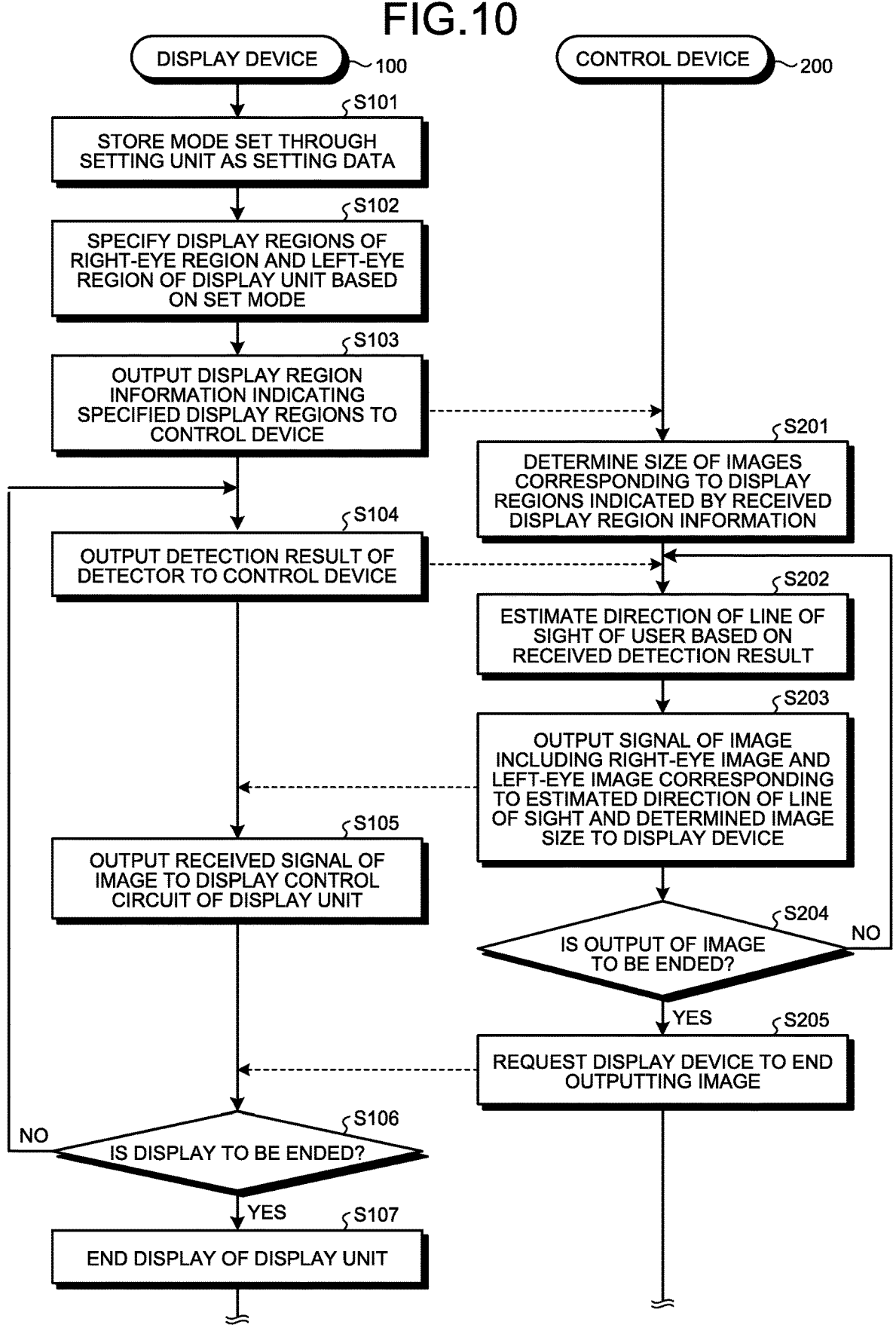
FIG. 10 is a sequence diagram illustrating an example of processing of the display device and a control device according to the first embodiment.

The following describes an example of operation of the display device 100 and the control device 200 according to the first embodiment with reference to FIG. 10. FIG. 10 is a sequence diagram illustrating an example of processing of the display device and the control device according to the first embodiment. The operation of the display device 100 illustrated in FIG. 10 is performed by execution of the control program 141 by the controller 150 of the display device 100. The operation of the control device 200 illustrated in FIG. 10 is performed by execution of the control program 211 and the VR application 212 by the controller 230 of the control device 200.

As illustrated in FIG. 10, at a predetermined time, the controller 150 of the display device 100 stores a mode set through the setting unit 130 as the setting data 142 (Step S101). Examples of the predetermined time include, but are not limited to, a time when a request to start is received from the control device 200 and a time when the display device 100 is coupled to the control device 200 through the cable 300.

The controller 150 of the display device 100 specifies the display regions of the right-eye region 110A and the left-eye region 110B of the display unit 110 based on the set mode (Step S102). For example, in the case of the first mode, the controller 150 specifies the entire region of the right-eye region 110A as the display region EA and the entire region of the left-eye region 110B as the display region EB. For example, in the case of the second mode, the controller 150 specifies the partial region of the right-eye region 110A as the display region EC and the partial region of the left-eye region 110B as the display region ED.

The controller 150 of the display device 100 outputs the display region information indicating the specified display regions to the control device 200 (Step S103). For example, the controller 150 creates the display region information, and outputs the created display region information to the control device 200 through the interface 160.

After receiving the display region information from the display device 100 through the interface 240, the controller 230 of the control device 200 determines the size of the images corresponding to the display regions indicated by the received display region information (Step S201).

After outputting the display region information to the control device 200, the controller 150 of the display device 100 outputs the detection result of the detector 120 to the control device 200 (Step S104). For example, the controller 150 outputs the information indicating the detection result of the detector 120 to the control device 200 through the interface 160.

The controller 230 of the control device 200 estimates the direction of the line of sight of the user based on the detection result of the detector 120 received from the display device 100 (Step S202). For example, the controller 230 estimates the direction of the line of sight based on an inclination of the display device 100. For example, the controller 230 estimates a change in the direction of the line of sight based on, for example, a change in acceleration or inclination occurring in the display device 100.

The controller 230 of the control device 200 outputs the signal SG of an image including the right-eye image and the left-eye image corresponding to the estimated direction of the line of sight and the determined image size to the display device 100 (Step S203). For example, the controller 230 outputs the signal SG of the image to the display device 100 through the interface 240.

After receiving the signal SG of the image through the interface 160, the controller 150 of the display device 100 outputs the received signal SG of the image to the display control circuit 112 of the display unit 110 (Step S105). As a result, the display unit 110 displays the right-eye image of the signal SG in the display region of the right-eye region 110A, and displays the left-eye image of the signal SG in the display region of the left-eye region 110B.

The controller 230 of the control device 200 determines whether to end outputting the image (Step S204). The controller 230 determines to end outputting the image, for example, if an exit operation by the user is detected or if the output of the image has ended. The exit operation by the user may be received by the display device 100, and information indicating the exit operation may be transmitted from the display device 100 to the control device 200. If the controller 230 determines not to end outputting the image (No at Step S204), the controller 230 returns the process to Step S202 already described to continue outputting the signal SG of the image.

If the controller 230 of the control device 200 determines to end outputting the image (Yes at Step S204), the controller 230 performs processing at Step S205. The controller 230 requests the display device 100 to end outputting the image (Step S205). For example, the controller 230 outputs information indicating to end outputting the image to the display device 100 through the interface 240. Then, the controller 230 transitions, for example, a standby state.

After the processing at Step S105 has ended, the controller 150 of the display device 100 determines whether to end the display (Step S106). If a request to end the display received from the control device 200, the controller 150 determines to end the display. If the controller 150 determines not to end the display (No at Step S106), the controller 150 returns the process to Step S104 already described to continue the display of the display unit 110.

If the controller 150 of the display device 100 determines to end the display (Yes at Step S106), the controller 150 performs processing at Step S107. The controller 150 ends the display of the display unit 110 (Step S107). Then, the controller 150 transitions, for example, a standby state.

Second Embodiment

In the first embodiment, the case has been described where the control device 200 of the display system 1 outputs the signal of the image including the right-eye image and the left-eye image to the display device 100. However, the present disclosure is not limited to this case. For example, the control device 200 may output a signal of an image including only one of the right-eye image and the left-eye image to the display device 100. An example in this case will be described with reference to the display system 1 according to the first embodiment. In the following description, the same components may be denoted by the same reference numerals. In addition, the description thereof may not be repeated.

In a second embodiment of the present disclosure, the display device 100 includes the first mode and the second mode. The first mode is a mode of setting the entire right-eye region 110A and the entire left-eye region 110B as the display regions. The second mode is a mode of setting a portion of the right-eye region 110A and a portion of the left-eye region 110B as the display regions smaller than those in the first mode. The second mode is a mode of displaying the same image in the right-eye region 110A and the left-eye region 110B.

In the same way as in the first embodiment, when the first mode is set through the setting unit 130, the display device 100 receives, from the control device 200, the signal SG output based on the display region information received from the display device 100. The display region information includes information indicating the number of viewpoints in addition to the information indicating the resolution. The signal SG in the first mode includes, for example, the information indicating two as the number of viewpoints. Based on the information indicating the number of viewpoints and the resolution included in the display region information, the control device 200 supplies, to the display device 100, the signal SG corresponding to images including the right-eye image GA and the left-eye image GB corresponding to the two viewpoints. The display device 100 causes the scanning circuit 114 to sequentially scan the scanning lines $P_1$ to $P_{1700}$ to display the images represented by the signal SG on the entire surface of the display panel 111. The display device 100 displays the right-eye image GA of the signal SG in the display region EA of the right-eye region 110A, and displays the left-eye image GB of the signal SG in the display region EB of the left-eye region 110B. As a result, the user can stereoscopically view the image by viewing the right-eye image GA and the left-eye image GB displayed on the display device 100.

Figure 11:
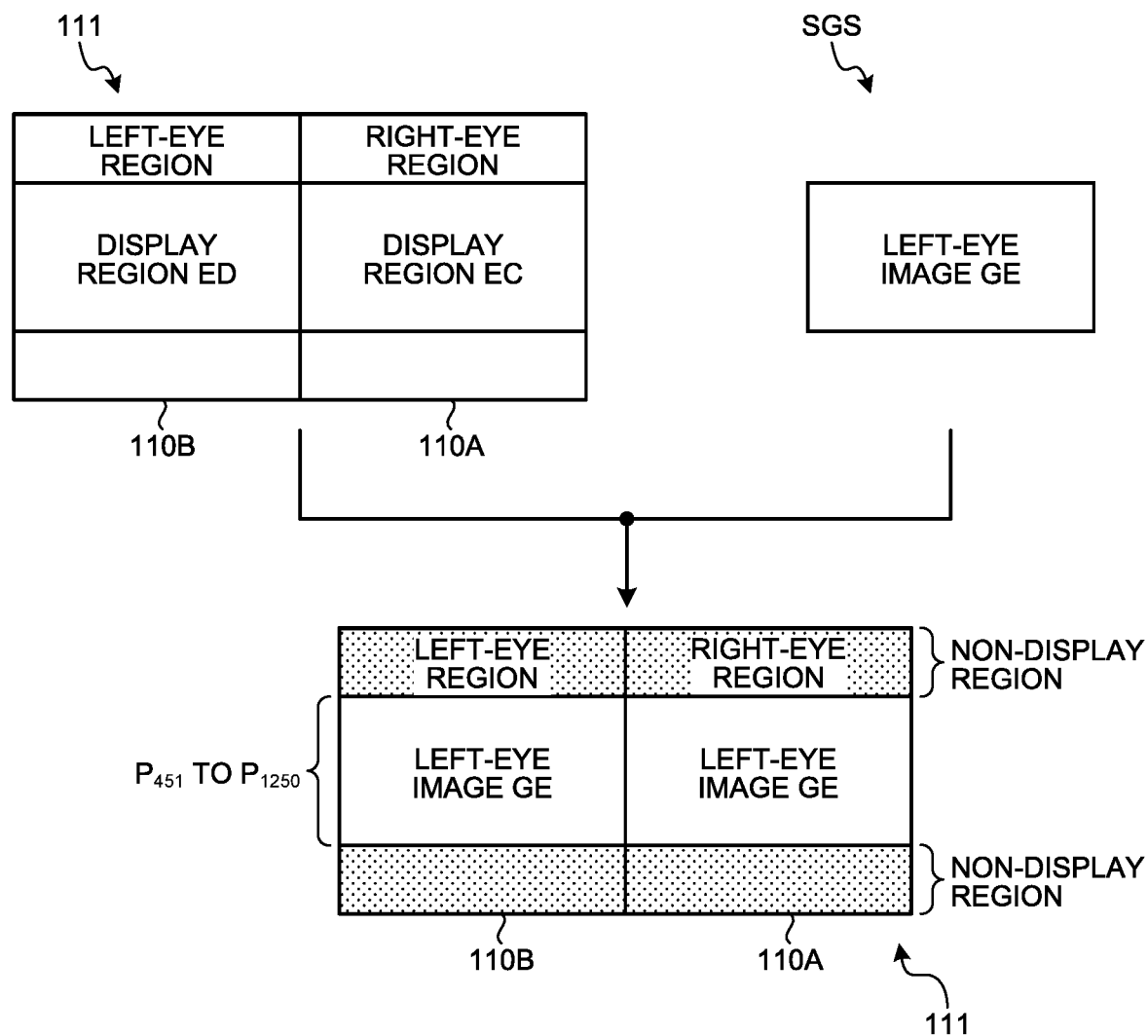
FIG. 11 is a diagram illustrating an example of the display control of the display system according to a second embodiment of the present disclosure.

FIG. 11 is a diagram illustrating an example of the display control of the display system 1 according to the second embodiment. In the example illustrated in FIG. 11, the display device 100 is set to the second mode through the setting unit 130. In this case, the partial region of the right-eye region 110A of the display panel 111 serves as the display region EC, and the partial region of the left-eye region 110B of the display panel 111 serves as the display region ED.

The control device 200 receives the display region information from the display device 100 through the interface 240. The display region information includes the information indicating the number of viewpoints in addition to the information indicating the resolution. For example, a signal SGS in the second mode includes the information indicating one as the number of viewpoints. Based on the information indicating the resolution and the number of viewpoints included in the display region information, the control device 200 outputs the signal SGS representing an image (for example, the left-eye image) corresponding to the right eye or the left eye to the display device 100. If the storage 220 of the control device 200 stores information indicating the number of viewpoints in each of the modes, the information included in the display region information received from the display device 100 may be information indicating a set mode instead of the information indicating the number of viewpoints.

The signal SGS illustrated in FIG. 11 represents, for example, a signal for an image of one frame. The size of the image represented by the signal SGS is approximately half that of the images represented by the signal SG illustrated in FIG. 6. That is, the control device 200 can cause the size of the image to be processed to be smaller than that of the images represented by the signal SG. As a result, the processing load can be reduced in the control device 200.

After receiving the signal SGS from the control device 200, the display device 100 makes a copy of the left-eye image of the signal SGS, and handles the copied image as the right-eye image. For example, the controller 150 copies the left-eye image of the signal SGS as the right-eye image, and outputs a signal SG' obtained by adding the right-eye image to the left-eye image to the display unit 110. The display device 100 causes the scanning circuit 114 to sequentially scan the scanning lines $P_{451}$ to $P_{1250}$ to display the images each represented by the signal SGS in the partial display regions EC and ED of the display panel 111. That is, the display device 100 displays a left-eye image GE of the signal SGS in both the display region EC of the right-eye region 110A and the display region ED of the left-eye region 110B. The display device 100 collectively scans the scanning lines corresponding to the non-display regions of the display panel 111 to display the non-display regions in, for example, black or gray. As a result, the user can view the left-eye images GE and GE displayed on the display device 100.

After receiving the signal of the image including only one of the right-eye image and the left-eye image corresponding to the display region indicated by the display region information, the display device 100 can display the received image in the display regions of both the right-eye region 110A and the left-eye region 110B indicated by the display region information. Therefore, the control device 200 only needs to output the signal of the image including only the right-eye image or the left-eye image to the display device 100. As a result, the processing load can be reduced.

In the display system 1 according to the second embodiment, when the display device 100 is in the first mode, the control device 200 generates an image having 4.9 million (2880×1700) pixels. When the display device 100 is in the second mode, the control device 200 generates an image having 1.15 million (1440×800) pixels, which are half as many as 2.3 million (2880×800) pixels.

For example, a case will be described where the control device 200 uses the GPU capable of generating 90 images per second (90 fps) at the image resolution of 1920×1080. When the display device 100 is in the first mode, the control device 200 generates 38 images each having 4.9 million pixels in each second. When the display device 100 is in the second mode, the control device 200 generates 162 images each having 1.15 million pixels in each second. In this case, the display system 1 cannot perform the smooth display because the drop frame or the screen tearing occurs in the first mode, but can perform the smooth display without causing the drop frame or the screen tearing in the second mode. Therefore, the display system 1 can allow the user to view the smooth display by allowing the user to set the display device 100 to the second mode depending on the graphic performance of the control device 200.

In the display system 1 according to the second embodiment, since the display device 100 can change the size of the display region depending on the mode to reduce the number of pixels of the image received by the display device 100, the processing load of the control device 200 can be reduced. As a result, when the display system 1 uses the display unit 110 usable for VR, the display system 1 can restrain the occurrence of the drop frame and the screen tearing even if the graphic performance of the control device 200 is low. Consequently, the display system 1 can restrain reduction in visibility of the image displayed in each of the left-eye region 110B and the right-eye region 110A of the display panel 111.

Third Embodiment

In each of the first and second embodiments, the case has been described where the display device 100 of the display system 1 changes the display regions of the right-eye region 110A and the left-eye region 110B depending on the mode. However, the present disclosure is not limited to this case. For example, the display device 100 need not change the display regions of the right-eye region 110A and the left-eye region 110B depending on the mode. The control device 200 may output the signal of the image including only one of the right-eye image and the left-eye image to the display device 100 in the same way as in the second embodiment. In the following description, the same components as those in the first embodiment will be denoted by the same reference numerals, and the description thereof will not be repeated.

In a third embodiment of the present disclosure, the display device 100 includes the first mode and the second mode. The first and second modes are modes of setting the entire right-eye region 110A and the entire left-eye region 110B as the display regions. The first mode is the same mode as that in the first and second embodiments. The second mode is a mode of setting the entire right-eye region 110A and the entire left-eye region 110B as the display regions and displaying the same image in both of the display regions.

In the same way as in the first embodiment, when the first mode is set through the setting unit 130, the display device 100 receives, from the control device 200, the signal SG output based on the display region information received from the display device 100. The display region information includes the information indicating the number of viewpoints. The signal SG in the first mode includes, for example, the information indicating two as the number of viewpoints. Based on the information indicating the number of viewpoints included in the display region information, the control device 200 supplies the signal SG corresponding to the images including the right-eye image GA and the left-eye image GB corresponding to the two viewpoints to the display device 100. The display device 100 causes the scanning circuit 114 to sequentially scan the scanning lines $P_1$ to $P_{1700}$ to display the images represented by the signal SG on the entire surface of the display panel 111. The display device 100 displays the right-eye image GA of the signal SG in the display region EA of the right-eye region 110A, and displays the left-eye image GB of the signal SG in the display region EB of the left-eye region 110B. As a result, the user can stereoscopically view the image by viewing the right-eye image GA and the left-eye image GB displayed on the display device 100.

Figure 12:
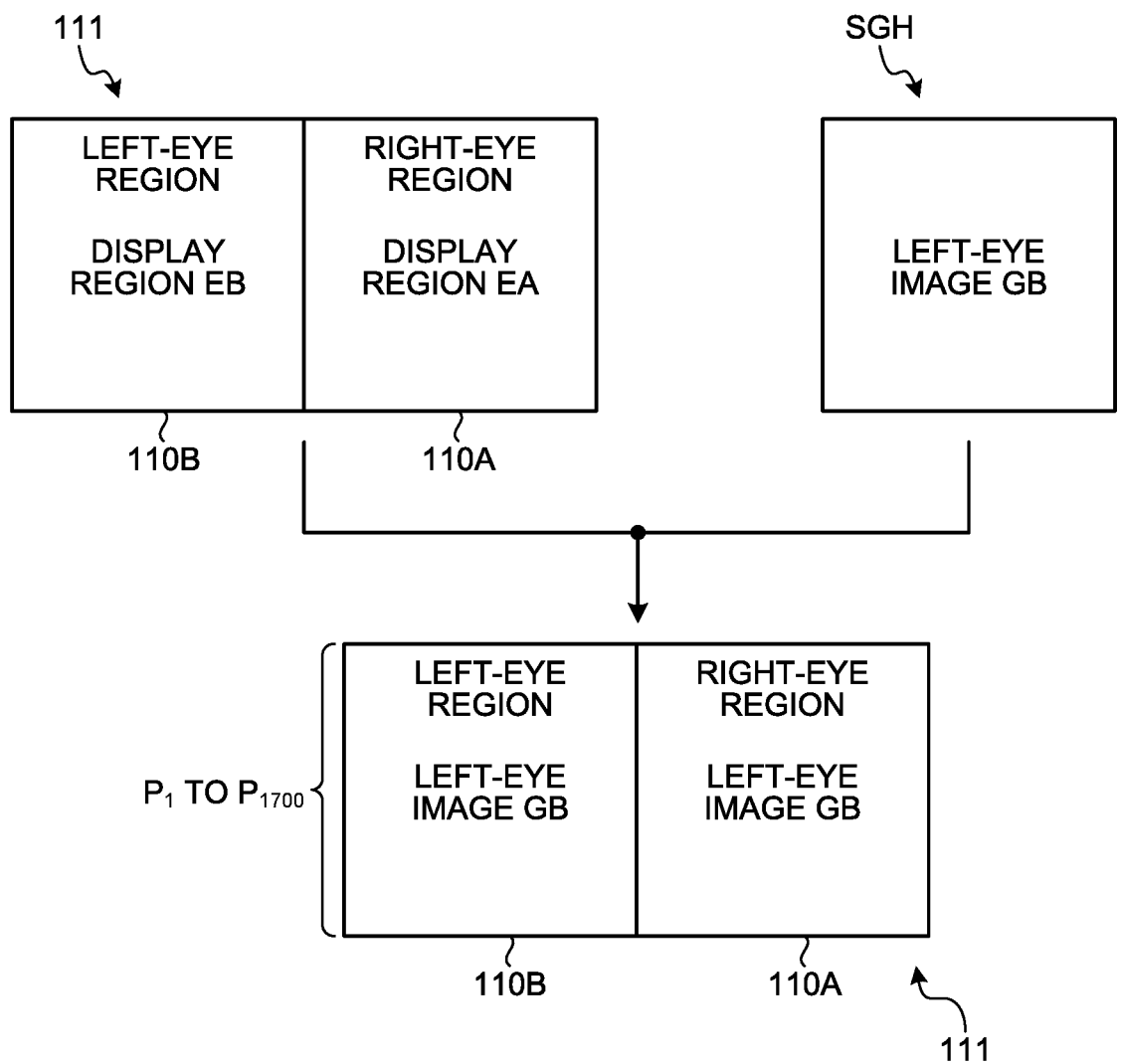
FIG. 12 is a diagram illustrating an example of the display control of the display system according to a third embodiment of the present disclosure.

FIG. 12 is a diagram illustrating an example of the display control of the display system 1 according to the third embodiment. In the example illustrated in FIG. 12, the display device 100 is set to the second mode through the setting unit 130. In this case, the entire region of the right-eye region 110A of the display panel 111 serves as the display region EA, and the entire region of the left-eye region 110B of the display panel 111 serves as the display region EB.

The control device 200 receives the display region information from the display device 100 through the interface 240. The display region information includes the information indicating the number of viewpoints. The signal SG in the second mode includes, for example, the information indicating one as the number of viewpoints. Based on the information indicating the resolution and the number of viewpoints included in the display region information, the control device 200 outputs a signal SGH representing an image (for example, the left-eye image) corresponding to the right eye or the left eye to the display device 100.

The signal SGH illustrated in FIG. 12, for example, represents a signal for an image of one frame. The size of the image represented by the signal SGH is the same as that of the left-eye image GB represented by the signal SG illustrated in FIG. 5, and is half that of the left-eye image GB and the right-eye image GA represented by the signal SG. That is, the control device 200 can cause the size of the image to be processed to be smaller than that of the images represented by the signal SG. As a result, the processing load can be reduced in the control device 200.

After receiving the signal SGH from the control device 200, the display device 100 makes a copy of the left-eye image of the signal SGH, and handles the copied image as the right-eye image. For example, the controller 150 copies the left-eye image GB of the signal SGH as the right-eye image, and outputs the signal SG' obtained by adding the right-eye image to the left-eye image to the display unit 110. The display device 100 causes the scanning circuit 114 to sequentially scan the scanning lines $P_1$ to $P_{1700}$ to display the images each represented by the signal SGH in the display regions EA and EB of the display panel 111. That is, the display device 100 displays the left-eye image GB of the signal SGH in both the display region EA of the right-eye region 110A and the display region EB of the left-eye region 110B. As a result, the user can view the left-eye images GB and GB displayed on the display device 100.

After receiving the signal of the image including only one of the right-eye image and the left-eye image corresponding to the display region indicated by the display region information, the display device 100 can display the received image in both the display regions EA and EB of the right-eye region 110A and the left-eye region 110B indicated by the display region information. Therefore, the control device 200 only needs to output the signal of the image including only the right-eye image or the left-eye image to the display device 100. As a result, the processing load can be reduced.

In the display system 1 according to the third embodiment, when the display device 100 is in the first mode, the control device 200 generates an image having 4.9 million (2880×1700) pixels. When the display device 100 is in the second mode, the control device 200 generates an image having 2.45 million (1440×1700) pixels, which are half as many as 4.9 million (2880×1700) pixels.

For example, a case will be described where the control device 200 uses the GPU capable of generating 90 images per second (90 fps) at the image resolution of 1920×1080. When the display device 100 is in the first mode, the control device 200 generates 38 images each having 4.9 million pixels in each second. When the display device 100 is in the second mode, the control device 200 generates 76 images each having 2.45 million pixels in each second. In this case, the display system 1 cannot perform the smooth display because the drop frame or the screen tearing occurs in the first mode, but can perform the smooth display without causing the drop frame or the screen tearing in the second mode. Therefore, the display system 1 can allow the user to view the smooth display by allowing the user to set the display device 100 to the second mode depending on the graphic performance of the control device 200.

In the display system 1 according to the third embodiment, since the display device 100 can change the size of the image from the control device 200 depending on the mode to reduce the resolution of the display unit 110, the processing load of the control device 200 can be reduced. As a result, when the display system 1 uses the display unit 110 usable for VR, the display system 1 can restrain the occurrence of the drop frame and the screen tearing even if the graphic performance of the control device 200 is low. Consequently, the display system 1 can restrain reduction in visibility of the image displayed in each of the left-eye region 110B and the right-eye region 110A of the display panel 111.

Fourth Embodiment

Figure 13:
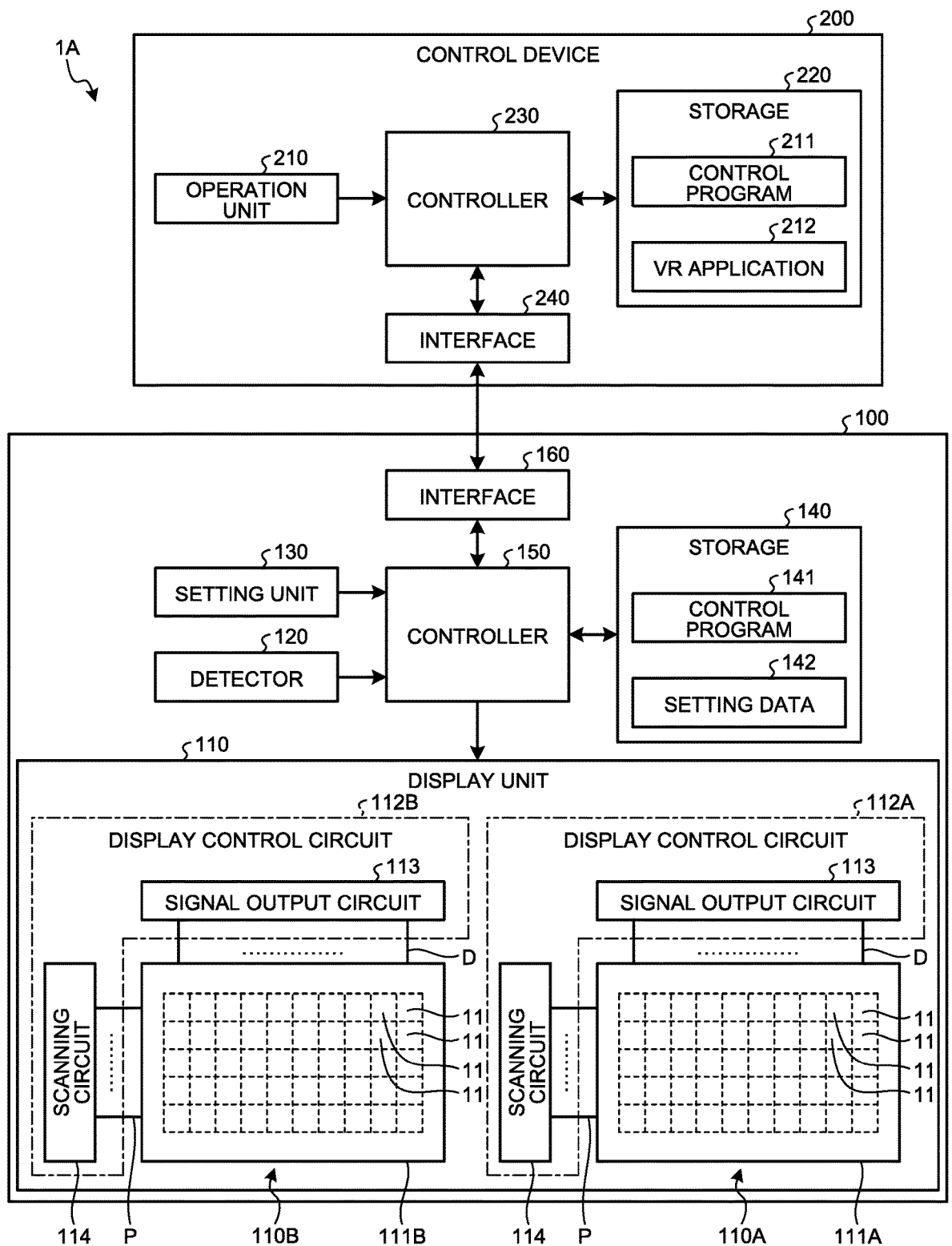
FIG. 13 is a block diagram illustrating an example of a configuration of a display system according to a fourth embodiment of the present disclosure.

The following describes an example of a display system 1A according to a fourth embodiment of the present disclosure with reference to FIG. 13. FIG. 13 is a block diagram illustrating an example of a configuration of the display system 1A according to the fourth embodiment. The display system 1A according to the fourth embodiment differs from the counterpart according to the first embodiment only in the configuration of the display unit 110. Therefore, the same components as those in the first embodiment will be denoted by the same reference numerals, and the description thereof will not be repeated.

As illustrated in FIG. 13, the display system 1A according to the fourth embodiment includes the display device 100 and the control device 200. The display device 100 includes the display unit 110, the detector 120, the setting unit 130, the storage 140, the controller 150, and the interface 160.

The display unit 110 has the right-eye region 110A and the left-eye region 110B. The display unit 110 includes two display panels 111A and 111B and two display control circuits 112A and 112B. The display unit 110 includes a light source device (not illustrated) that irradiates the display panels 111A and 111B from behind. The light source device included in the display unit 110 may include one light source device for both of the display panels 111A and 111B, or may include one light source device for each of the display panels 111A and 111B.

In each of the display panels 111A and 111B, the $P_0 \times Q_0$ pixels 11 ($P_0$ pixels in the row direction and $Q_0$ pixels in the column direction) are arranged in a two-dimensional matrix (in a row-column configuration). The example depicted in FIG. 13 illustrates an example in which the pixels 11 are arranged in matrices in the two-dimensional XY-coordinate system. In the fourth embodiment, $P_0=1700$, and $Q_0=1440$.

Each of the display panels 111A and 111B includes the signal lines extending in the X-direction and the scanning lines extending in the Y-direction intersecting the X-direction. Each of the display panels 111A and 111B includes, for example, the 1440 signal lines arranged in the Y-direction and the 1700 scanning lines arranged in the X-direction intersecting the Y-direction. In the display panels 111A and 111B, the pixels 11 are disposed at the respective intersecting points between the signal lines and the scanning lines. Each of the pixels 11 includes the switching element (TFT) coupled to one of the signal lines and one of the scanning lines, and includes the pixel electrode coupled to the switching element. Each of the scanning lines is coupled to a plurality of the pixels 11 arranged along the extending direction of the scanning line. Each of the signal lines is coupled to a plurality of the pixels 11 arranged along the extending direction of the signal line.

The display panel 111A serves as the right-eye region 110A of the display unit 110. The display panel 111B serves as the left-eye region 110B of the display unit 110. The right-eye region 110A is, for example, the region in the right half of the display surface of the display unit 110 capable of displaying an image. The left-eye region 110B is, for example, the region in the left half of the display surface of the display unit 110 capable of displaying an image. The display device 100 uses the two display panels 111A and 111B so as to be capable of arranging the display panels 111A and 111B with a gap interposed therebetween.

Each of the display control circuits 112A and 112B includes the signal output circuit 113 and the scanning circuit 114. The signal output circuit 113 of each of the display control circuits 112A and 112B differs from the signal output circuit 113 of the display control circuit 112 according to the first embodiment in the number of signal lines. The signal output circuit 113 of each of the display control circuits 112A and 112B includes 1440 signal lines.

The signal output circuit 113 of the display control circuit 112A is electrically coupled to the signal lines D of the display panel 111A. The signal output circuit 113 of the display control circuit 112A outputs the display signals of the right-eye image of the received signal SG to the display panel 111A. The signal output circuit 113 may receive signals obtained by extracting only the right-eye image from the signal SG.

The signal output circuit 113 of the display control circuit 112B is electrically coupled to the signal lines of the display panel 111B. The signal output circuit 113 of the display control circuit 112B outputs the display signals of the left-eye image of the received signal SG to the display panel 111B. The signal output circuit 113 may receive signals obtained by extracting only the left-eye image from the signal SG.

The display control circuit 112A causes the scanning circuit 114 to control on and off of the switching element (for example, the TFT) for controlling the operation (light transmittance) of the pixel 11 in the display panel 111A. The scanning circuit 114 is electrically coupled to the scanning lines P of the display panel 111A. The display control circuit 112B causes the scanning circuit 114 to control on and off of the switching element for controlling the operation (light transmittance) of the pixel 11 in the display panel 111B. The scanning circuit 114 is electrically coupled to the scanning lines P of the display panel 111B.

The signal output circuit 113 of each of the display control circuits 112A and 112B includes the first signal output unit 113A, the second signal output unit 113B, and the selector 113C, which have already been described. The scanning circuit 114 of each of the display control circuits 112A and 112B includes the first scanner 114A, the second scanner 114B, and the selector 114C, which have already been described. The signal output circuit 113 differs in only the number of signal lines.

Figure 14:
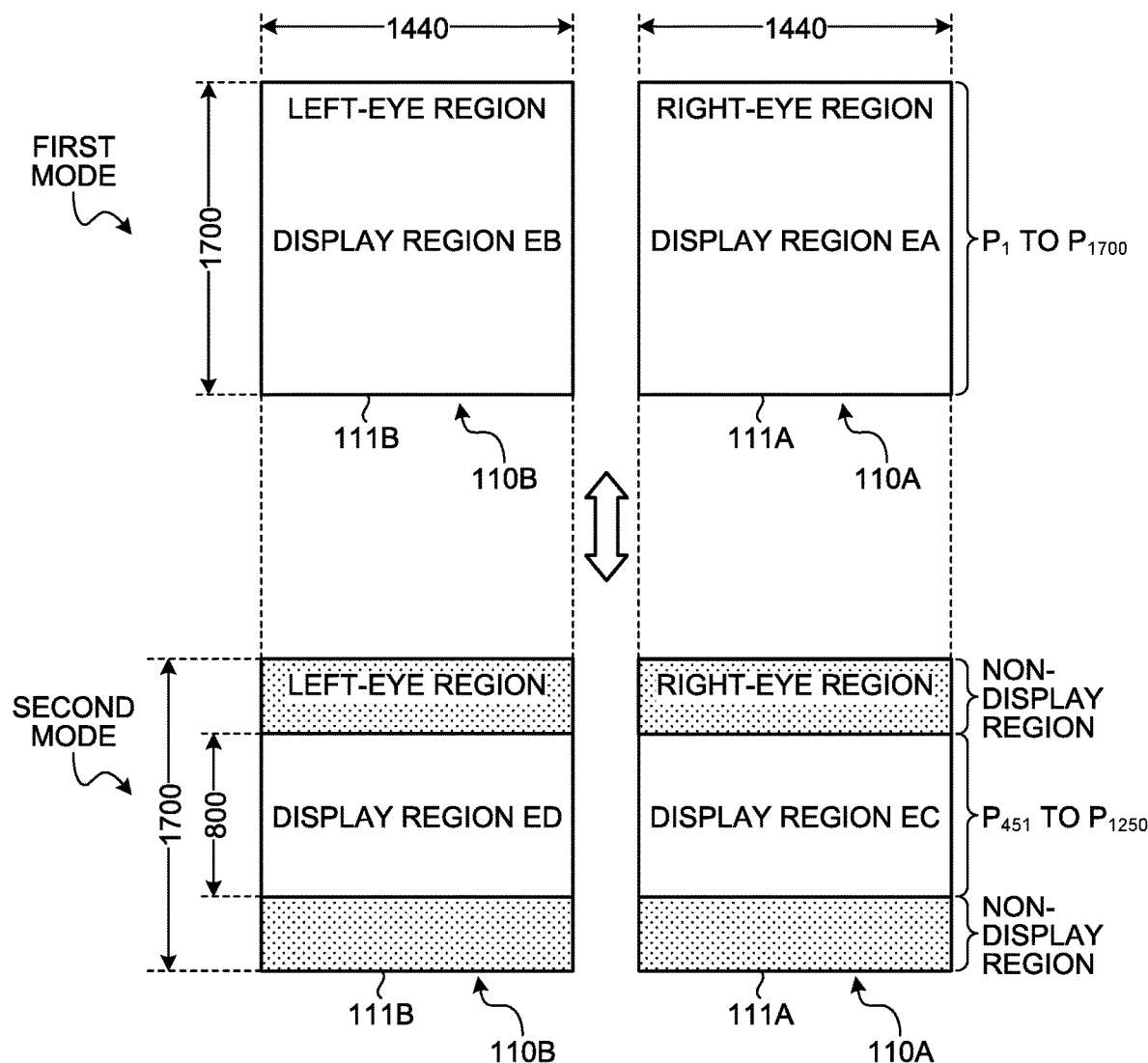
FIG. 14 is a diagram illustrating an example of the display modes of the display device according to the fourth embodiment.

The following describes a relation of the right-eye region 110A and the left-eye region 110B with settable modes in the display unit 110 of the display device 100 according to the fourth embodiment. FIG. 14 is a diagram illustrating an example of the display modes of the display device 100 according to the fourth embodiment.

In the example illustrated in FIG. 14, the pixels 11 are arranged in a matrix of 1440×1700 pixels in each of the display panels 111A and 111B. In this case, the display panels 111A and 111B include the 1700 scanning lines $P_1$ to $P_{1700}$. The scanning lines $P_1$ to $P_{1700}$ are provided in each of the display panels 111A and 111B.

The display device 100 includes the first mode and the second mode. The first mode and the second mode are set through the setting unit 130. The first mode and the second mode can be set, for example, based on the processing capacity of the control device 200 that is used by the user.

The first mode is a mode of setting the entire right-eye region 110A of the display panel 111A and the entire left-eye region 110B of the display panel 111B as the display regions. In the first mode, all the 1700 scanning lines $P_1$ to $P_{1700}$ in each of the display panels 111A and 111B are set as the effective scanning lines. When the first mode is set, the display device 100 sets the entire region of the right-eye region 110A corresponding to the scanning lines $P_1$ to $P_{1700}$ as the display region EA, and sets the entire region of the left-eye region 110B corresponding to the scanning lines $P_1$ to $P_{1700}$ as the display region EB.

The second mode is a mode of setting a portion of the right-eye region 110A of the display panel 111A and a portion of the left-eye region 110B of the display panel 111B as the display regions smaller than those in the first mode. In the second mode, some of the scanning lines in each of the display panels 111A and 111B fewer than those in the first mode, for example, the 800 scanning lines $P_{451}$ to $P_{1250}$ of the 1700 scanning lines are set as the effective scanning lines. In the second mode, the scanning lines $P_1$ to $P_{450}$ and $P_{1251}$ to $P_{1700}$ in each of the display panels 111A and 111B are set as the ineffective scanning lines. When the second mode is set, the display device 100 sets a partial region of the right-eye region 110A corresponding to the scanning lines $P_{451}$ to $P_{1250}$ as the display region EC, and sets a partial region of the left-eye region 110B corresponding to the scanning lines $P_{451}$ to $P_{1250}$ as the display region ED, in each of the display panels 111A and 111B.

When the first mode is set through the setting unit 130, the controller 150 of the display device 100 outputs the display region information indicating the display region EA of the right-eye region 110A and the display region EB of the left-eye region 110B to the control device 200 through the interface 160. When the first mode is set, the display region information serves as information indicating the display regions in which all the scanning lines of the display panels 111A and 111B are effective. The display device 100 may add the two display regions of the display panels 111A and 111B together as information indicating one display region.

When the second mode is set through the setting unit 130, the controller 150 of the display device 100 outputs the display region information indicating the display region EC as a portion of the right-eye region 110A and the display region ED as a portion of the left-eye region 110B to the control device 200 through the interface 160. When the second mode is set, the display region information serves as information indicating the display regions in which some of the scanning lines in each of the display panels 111A and 111B are effective. That is, the controller 150 outputs the display region information obtained by reducing the display performance of the display panels 111A and 111B to the control device 200.

Figure 15:
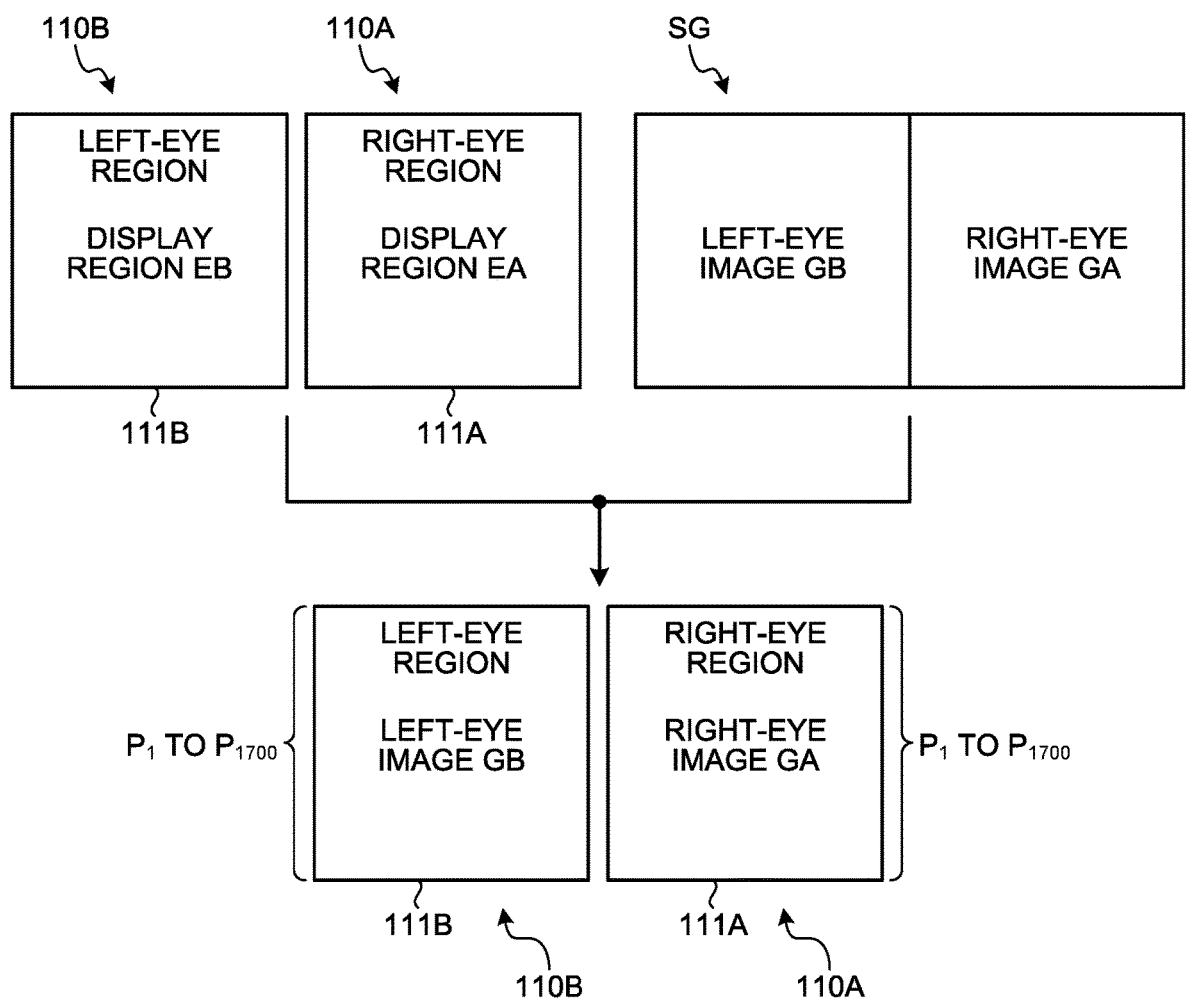
FIG. 15 is a diagram illustrating an example of the display control of the display system according to the fourth embodiment.
Figure 16:
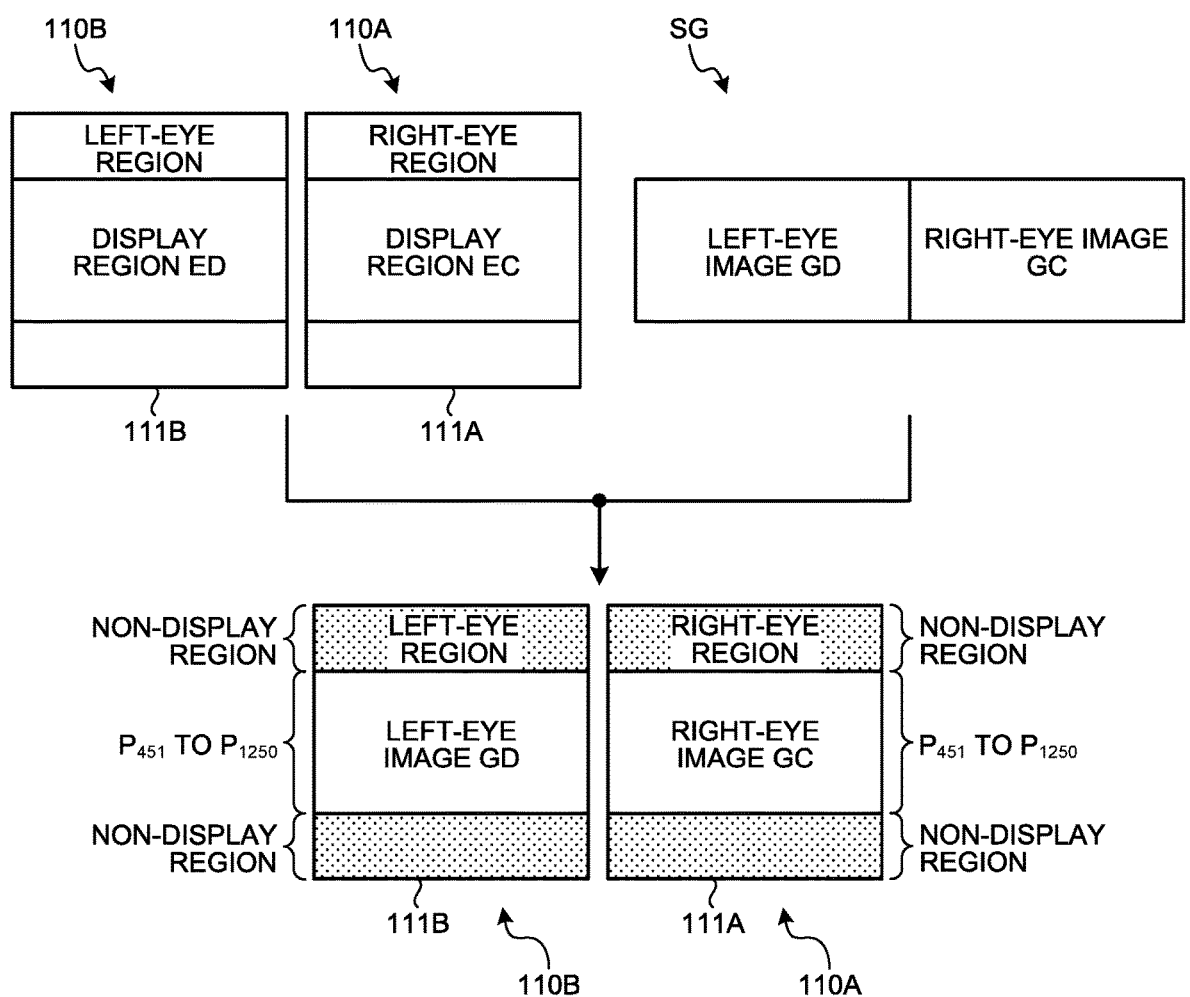
FIG. 16 is a diagram illustrating another example of the display control of the display system according to the fourth embodiment.

The following describes an example of the display control of the display system 1A according to the fourth embodiment. FIG. 15 is a diagram illustrating an example of the display control of the display system 1A according to the fourth embodiment. FIG. 16 is a diagram illustrating another example of the display control of the display system 1A according to the fourth embodiment.

In the example illustrated in FIG. 15, the display device 100 is set to the first mode through the setting unit 130. In this case, the entire region of the display panel 111A serving as the right-eye region 110A serves as the display region EA, and the entire region of the display panel 111B serving as the left-eye region 110B serves as the display region EB.

The control device 200 receives the display region information indicating the display region EA of the right-eye region 110A and the display region EB of the left-eye region 110B from the display device 100 through the interface 240. The display region information includes, for example, information indicating the resolution of the respective display panels 111A and 111B. The resolution includes the pixel resolution representing the density of the pixels in the display regions of the image and the image resolution representing the number of pixels in the display regions of the image. The control device 200 determines the size of the image to be output to the display device 100 based on the display region information. For example, the control device 200 outputs the signal SG representing the right-eye image GA and the left-eye image GB to the display device 100, the right-eye and left-eye images GA and GB corresponding to the display regions EA and EB of the display device 100 and obtained using the parallax between both eyes of the user. The control device 200 determines the size of the image by, for example, multiplying the image resolution included in the display region information by the pixel resolution. As illustrated in FIG. 15, the image resolution included in the display region information is the number of pixels corresponding to the entire region of the display panels 111A and 111B. Therefore, the control device 200 determines the entire region of the display panels 111A and 111B to be the size of the image, and outputs the signal SG corresponding to the determined size of the image to the display device 100. The signal SG illustrated in FIG. 15 represents, for example, a signal for images of one frame. In the present example, the pixel resolution corresponds to the density of the pixels per unit area of the display device 100.

After receiving the signal SG from the control device 200, the display device 100 causes the scanning circuit 114 of the display control circuit 112A to sequentially scan the scanning lines $P_1$ to $P_{1700}$ to display the right-eye image GA represented by the signal SG on the entire surface of the display panel 111A. In addition, the display device 100 causes the scanning circuit 114 of the display control circuit 112B to sequentially scan the scanning lines $P_1$ to $P_{1700}$ to display the left-eye image GB represented by the signal SG on the entire surface of the display panel 111B. That is, the display device 100 displays the right-eye image GA of the signal SG in the display region EA of the display panel 111A, and displays the left-eye image GB of the signal SG in the display region EB of the display panel 111B. As a result, the user can stereoscopically view the image by viewing the right-eye image GA and the left-eye image GB displayed on the display device 100.

In the example illustrated in FIG. 16, the display device 100 is set to the second mode through the setting unit 130. In this case, the partial region of the display panel 111A serving as the right-eye region 110A serves as the display region EC, and the partial region of the display panel 111B serving as the left-eye region 110B serves as the display region ED.

The control device 200 receives, from the display device 100 through the interface 240, the display region information indicating the display region EC of the right-eye region 110A and the display region ED of the left-eye region 110B. The control device 200 determines the size of the image to be output to the display device 100 based on the display region information. For example, the control device 200 outputs the signal SG representing the right-eye image GC and the left-eye image GD to the display device 100, the right-eye and left-eye images GC and GD corresponding to the display regions EC and ED of the display device 100 and obtained using the parallax between both eyes of the user. For example, in the second mode, the image resolution included in the display region information is the number of pixels corresponding to a partial region of the display device 100, and therefore, is smaller than the image resolution in the first mode. Accordingly, in FIG. 16, the control device 200 outputs, to the display device 100, the signal SG corresponding to the partial region of the display device 100 based on the display region information including an image resolution less than that of the first mode. The right-eye image GC and the left-eye image GD are images smaller than the right-eye image GA and the left-eye image GB illustrated in FIG. 15. In the present example, the pixel resolution included in the display region information in the first mode is the same as the pixel resolution included in the display region information in the second mode. Therefore, the density of the pixels (pixel resolution) per unit area of the image of the signal SG in the first mode is the same as that of the image of the signal SG in the second mode. The pixel resolution in the second mode may be greater than the pixel resolution in the first mode.

The signal SG illustrated in FIG. 16, for example, represents the signal for images of one frame. The size of the images represented by the signal SG is smaller than that of the images represented by the signal SG illustrated in FIG. 15. That is, the control device 200 can cause the size of the images to be processed to be smaller in the case where the display device 100 is set to the second mode than in the case where the display device 100 is set to the first mode. As a result, the processing load can be reduced in the control device 200.

After receiving the signal SG from the control device 200, the display device 100 causes the scanning circuit 114 of the display control circuit 112A to sequentially scan the scanning lines $P_{451}$ to $P_{1250}$ to display the right-eye image GC represented by the signal SG in the display region EC, which is a portion of the display panel 111A. In addition, the display device 100 causes the scanning circuit 114 of the display control circuit 112B to sequentially scan the scanning lines $P_{451}$ to $P_{1250}$ to display the left-eye image GD represented by the signal SG in the display region ED in a portion of the display panel 111B. That is, the display device 100 displays the right-eye image GC of the signal SG in the display region EC of the right-eye region 110A, and displays the left-eye image GD of the signal SG in the display region ED of the left-eye region 110B. The display device 100 collectively scans the scanning lines corresponding to the non-display regions of the display panels 111A and 111B to display the non-display regions in, for example, black or gray. As a result, the user can stereoscopically view the image by viewing the right-eye image GC and the left-eye image GD displayed on the display device 100.

The display device 100 outputs the display region information indicating the display regions of the right-eye region 110A of the display panel 111A and the left-eye region 110B of the display panel 111B set by the user and the detection result of the detector 120 to the control device 200, and thus, can cause the display device 100 to output the image suitable for the processing capacity of the control device 200. As a result, the display system 1A can output the image depending on the processing capacity of the control device 200 so as to be capable of smoothly display the image of the virtual reality on the display unit 110 even if the line of sight of the user moves. Consequently, the display device 100 and the display system 1A including the display device 100 can restrain reduction in visibility of the image displayed in each of the left-eye region 110B and the right-eye region 110A of the display unit 110.

In the display system 1A according to the fourth embodiment, when the display device 100 is in the first mode, the control device 200 generates an image having 4.9 million (2880×1700) pixels. When the display device 100 is in the second mode, the control device 200 generates an image having 2.3 million (2880×800) pixels.

For example, a case will be described where the control device 200 uses the GPU capable of generating 90 images per second (90 fps) at the image resolution of 1920×1080. When the display device 100 is in the first mode, the control device 200 generates 38 images each having 4.9 million pixels in each second. When the display device 100 is in the second mode, the control device 200 generates 81 images each having 2.3 million pixels in each second. In this case, the display system 1A cannot perform the smooth display because the drop frame or the screen tearing occurs in the first mode, but can perform the smooth display without causing the drop frame or the screen tearing in the second mode. Therefore, the display system 1A can allow the user to view the smooth display by allowing the user to set the display device 100 to the second mode depending on the graphic performance of the control device 200.

By having the first mode and the second mode, the display device 100 can allow the user to easily set the display regions of the display panels 111A and 111B through the setting unit 130. As a result, the display device 100 can improve the operability.

When the display device 100 is set to the second mode, regions including some of the effective scanning lines in the plurality of scanning lines are set as the display regions, and regions including scanning lines different from the some of the scanning lines are set as the non-display regions. As a result, the display device 100 can collectively display the non-display regions of the display panels 111A and 111B, and thus can improve the processing efficiency.

The processing of the display device 100 and the control device 200 according to the fourth embodiment is the same as the processing illustrated in FIG. 10 described in the first embodiment, and the processing at Step S105 illustrated in FIG. 10 only needs to be changed. Specifically, after receiving the signal SG of the image through the interface 160, the controller 150 of the display device 100 outputs the received signal SG of the image to the display control circuits 112A and 112B of the display unit 110.

Fifth Embodiment

In the fourth embodiment, the case has been described where the control device 200 of the display system 1A outputs the signal of the image including the right-eye image and the left-eye image to the display device 100. However, the present disclosure is not limited to this case. For example, the control device 200 may output a signal of an image including only one of the right-eye image and the left-eye image to the display device 100. An example in this case will be described with reference to the display system 1A according to the fourth embodiment. In the following description, the same components may be denoted by the same reference numerals. In addition, the description thereof may not be repeated.

In a fifth embodiment of the present disclosure, the display device 100 includes the first mode and the second mode. The first mode is a mode of setting the entire right-eye region 110A and the entire left-eye region 110B as the display regions. The second mode is a mode of setting a portion of the right-eye region 110A and a portion of the left-eye region 110B as the display regions smaller than those in the first mode. The second mode is a mode of displaying the same image in the right-eye region 110A and the left-eye region 110B.

In the same way as in the fourth embodiment, when the first mode is set through the setting unit 130, the display device 100 receives, from the control device 200, the signal SG output based on the display region information received from the display device 100. The display region information includes the information indicating the number of viewpoints in addition to the information indicating the image resolution. The signal SG in the first mode includes, for example, the information indicating two as the number of viewpoints. Based on the information indicating the number of viewpoints and the resolution included in the display region information, the control device 200 supplies, to the display device 100, the signal SG corresponding to the images including the right-eye image GA and the left-eye image GB corresponding to the two viewpoints. The display device 100 causes the scanning circuit 114 of the display control circuit 112A to sequentially scan the scanning lines $P_1$ to $P_{1700}$ to display the right-eye image GA represented by the signal SG on the entire surface of the display panel 111A. In addition, the display device 100 causes the scanning circuit 114 of the display control circuit 112B to sequentially scan the scanning lines $P_1$ to $P_{1700}$ to display the left-eye image GB represented by the signal SG on the entire surface of the display panel 111B. That is, the display device 100 displays the right-eye image GA of the signal SG in the display region EA of the display panel 111A, and displays the left-eye image GB of the signal SG in the display region EB of the display panel 111B. As a result, the user can stereoscopically view the image by viewing the right-eye image GA and the left-eye image GB displayed on the display device 100.

Figure 17:
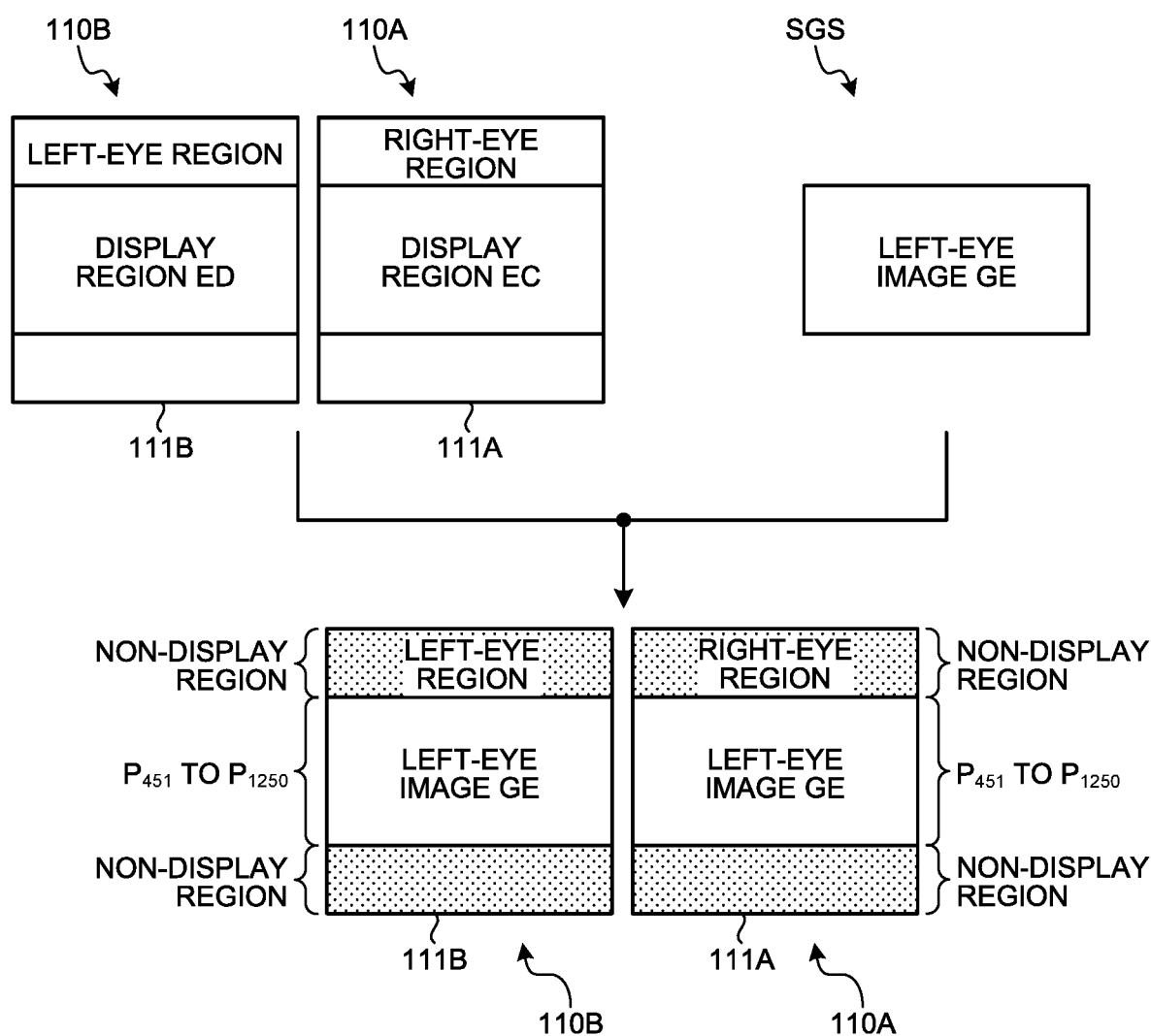
FIG. 17 is a diagram illustrating an example of the display control of the display system according to a fifth embodiment of the present disclosure.

FIG. 17 is a diagram illustrating an example of the display control of the display system 1A according to the fifth embodiment. In the example illustrated in FIG. 17, the display device 100 is set to the second mode through the setting unit 130. In this case, the partial region of the display panel 111A serving as the right-eye region 110A serves as the display region EC, and the partial region of the display panel 111B serving as the left-eye region 110B serves as the display region ED.

The control device 200 receives the display region information from the display device 100 through the interface 240. The display region information includes the information indicating the number of viewpoints in addition to the information indicating the resolution. The signal SG in the second mode includes, for example, the information indicating one as the number of viewpoints. Based on the information indicating the resolution and the number of viewpoints included in the display region information, the control device 200 outputs the signal SGS representing an image including only a predetermined left-eye image of the right-eye and left-eye images to the display device 100.

The signal SGS illustrated in FIG. 17, for example, represents a signal for an image of one frame. In the same way as in the second embodiment, the size of the image represented by the signal SGS is approximately half that of the images represented by the signal SG illustrated in FIG. 16. That is, the control device 200 can cause the size of the image to be processed to be smaller than that of the images represented by the signal SG. As a result, the processing load can be reduced in the control device 200.

After receiving the signal SGS from the control device 200, the display device 100 makes a copy of the left-eye image of the signal SGS, and handles the copied image as the right-eye image. For example, the controller 150 copies the left-eye image of the signal SGS as the right-eye image, and outputs the signal SG' obtained by adding the right-eye image to the left-eye image to the display unit 110.

After receiving the signal SG' from the controller 150, the display unit 110 causes the scanning circuit 114 of the display control circuit 112A to sequentially scan the scanning lines $P_{451}$ to $P_{1250}$ to display the left-eye image GE represented by the signal SGS in a portion of the display region EC in the display panel 111A. In addition, the display unit 110 causes the scanning circuit 114 of the display control circuit 112B to sequentially scan the scanning lines $P_{451}$ to $P_{1250}$ to display the left-eye image GE represented by the signal SGS in the display region ED in a portion of the display panel 111B. That is, the display device 100 displays the left-eye image GE of the signal SGS in the display region EC of the right-eye region 110A and in the display region ED of the left-eye region 110B. The display device 100 collectively scans the scanning lines corresponding to the non-display regions of the display panels 111A and 111B to display the non-display regions in, for example, black or gray. As a result, the user can view the left-eye images GE and GE displayed on the display device 100.

After receiving the signal of the image including only one of the right-eye image and the left-eye image corresponding to the display region indicated by the display region information, the display device 100 can display the received image in the display regions of both the display panels 111A and 111B indicated by the display region information. Therefore, the control device 200 only needs to output the signal of the image including only the right-eye image or the left-eye image to the display device 100. As a result, the processing load can be reduced.

In the display system 1A according to the fifth embodiment, when the display device 100 is in the first mode, the control device 200 generates an image having 4.9 million (2880×1700) pixels. When the display device 100 is in the second mode, the control device 200 generates an image having 1.15 million (1440×800) pixels, which are half as many as 2.3 million (2880×800) pixels.

For example, a case will be described where the control device 200 uses the GPU capable of generating 90 images per second (90 fps) at the image resolution of 1920×1080. When the display device 100 is in the first mode, the control device 200 generates 38 images each having 4.9 million pixels in each second. When the display device 100 is in the second mode, the control device 200 generates 162 images each having 1.15 million pixels in each second. In this case, the display system 1A cannot perform the smooth display because the drop frame or the screen tearing occurs in the first mode, but can perform the smooth display without causing the drop frame or the screen tearing in the second mode. Therefore, the display system 1A can allow the user to view the smooth display by allowing the user to set the display device 100 to the second mode depending on the graphic performance of the control device 200.

In the display system 1A according to the fifth embodiment, since the display device 100 can change the size of the display region depending on the mode to reduce the number of pixels of the image received by the display device 100, the processing load of the control device 200 can be reduced. As a result, when the display system 1A uses the display panels 111A and 111B usable for VR, the display system 1A can restrain the occurrence of the drop frame and the screen tearing even if the graphic performance of the control device 200 is low. As a result, the display system 1A can contribute to the restraint of reduction in visibility of the image displayed in each of the left-eye region 110B and the right-eye region 110A of the display panels 111A and 111B.

Sixth Embodiment

In each of the fourth and fifth embodiments, the case has been described where the display device 100 of the display system 1A changes the display regions of the right-eye region 110A and the left-eye region 110B depending on the mode. However, the present disclosure is not limited to this case. For example, the display device 100 need not change the display regions of the right-eye region 110A and the left-eye region 110B depending on the mode. The control device 200 may output the signal of the image including only one of the right-eye image and the left-eye image to the display device 100 in the same way as in the third embodiment. In the following description, the same components as those in the fourth embodiment will be denoted by the same reference numerals, and the description thereof will not be repeated.

In a sixth embodiment of the present disclosure, the display device 100 of the display system 1A includes the first mode and the second mode. The first and second modes are modes of setting the entire right-eye region 110A and the entire left-eye region 110B as the display regions. The first mode is the same mode as that in the fourth and fifth embodiments. The second mode is a mode of setting the entire right-eye region 110A and the entire left-eye region 110B as the display regions and displaying the same image in both of the display regions.

In the same way as in the fourth embodiment, when the first mode is set through the setting unit 130, the display device 100 receives, from the control device 200, the signal SG output based on the display region information received from the display device 100. The display region information includes the information indicating the number of viewpoints. The signal SG in the first mode includes, for example, the information indicating two as the number of viewpoints. Based on the information indicating the number of viewpoints included in the display region information, the control device 200 supplies the signal SG corresponding to the images including the right-eye image GA and the left-eye image GB corresponding to the two viewpoints to the display device 100. The display device 100 causes the scanning circuit 114 of the display control circuit 112A to sequentially scan the scanning lines $P_1$ to $P_{1700}$ to display the right-eye image GA represented by the signal SG on the entire surface of the display panel 111A. In addition, the display device 100 causes the scanning circuit 114 of the display control circuit 112B to sequentially scan the scanning lines $P_1$ to $P_{1700}$ to display the left-eye image GB represented by the signal SG on the entire surface of the display panel 111B. That is, the display device 100 displays the right-eye image GA of the signal SG in the display region EA of the display panel 111A, and displays the left-eye image GB of the signal SG in the display region EB of the display panel 111B. As a result, the user can stereoscopically view the image by viewing the right-eye image GA and the left-eye image GB displayed on the display device 100.

Figure 18:
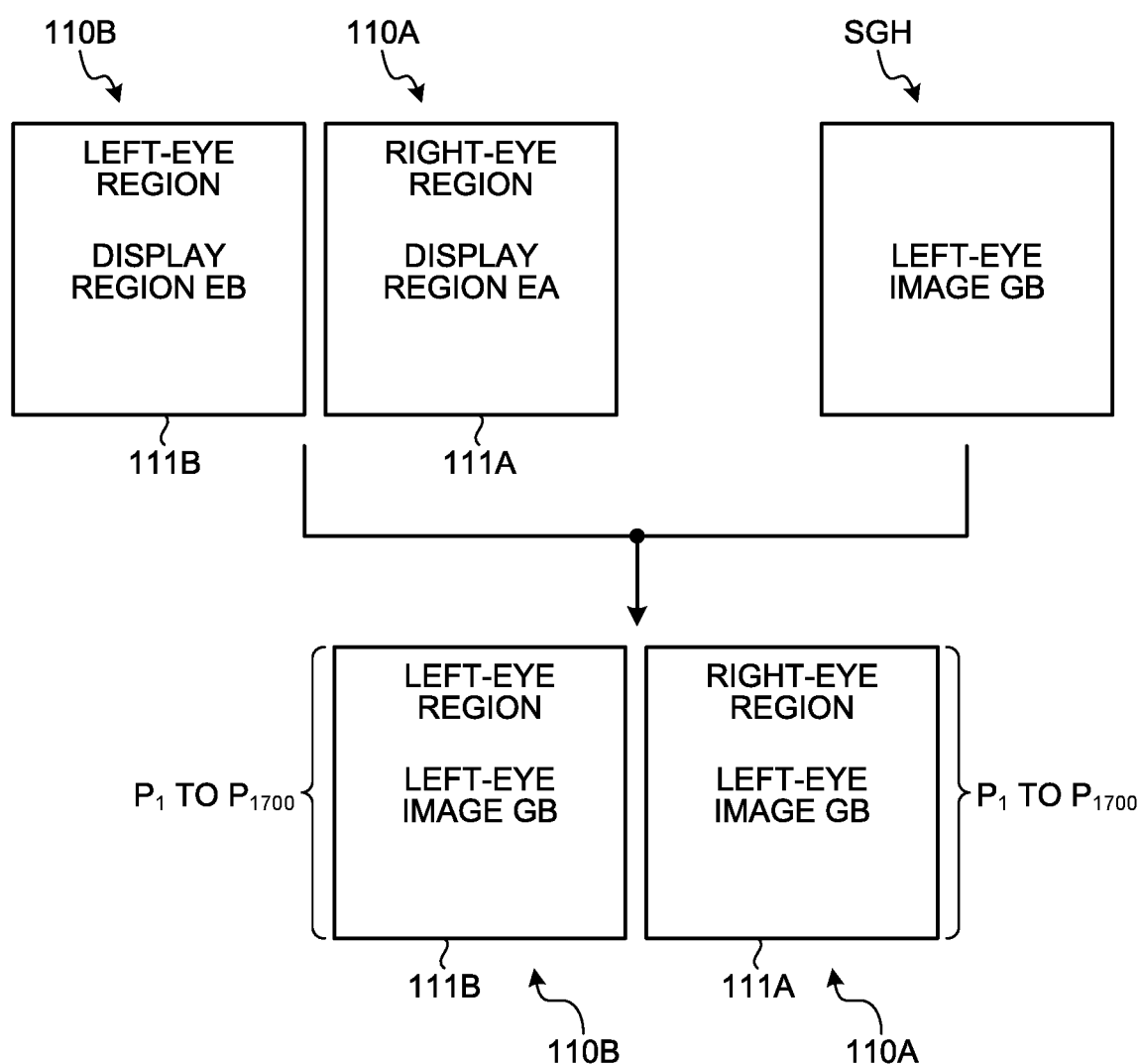
FIG. 18 is a diagram illustrating an example of the display control of the display system according to a sixth embodiment of the present disclosure.

FIG. 18 is a diagram illustrating an example of the display control of the display system 1A according to the sixth embodiment. In the example illustrated in FIG. 18, the display device 100 is set to the second mode through the setting unit 130. In this case, the entire region of the right-eye region 110A of the display panel 111A serves as the display region EA, and the entire region of the left-eye region 110B of the display panel 111B serves as the display region EB.

The control device 200 receives the display region information from the display device 100 through the interface 240. The display region information includes the information indicating the number of viewpoints. The signal SG in the second mode includes, for example, the information indicating one as the number of viewpoints. If a predetermined condition is satisfied, the control device 200 outputs the signal SGH representing an image including only a predetermined left-eye image of the right-eye and left-eye images to the display device 100.

The signal SGH illustrated in FIG. 18, for example, represents a signal for an image of one frame. The size of the image represented by the signal SGH is the same as that of the left-eye image GB represented by the signal SG illustrated in FIG. 15, and is half that of the left-eye image GB and the right-eye image GA represented by the signal SG. That is, the control device 200 can cause the size of the image to be processed to be smaller than that of the images represented by the signal SG. As a result, the processing load can be reduced in the control device 200.

After receiving the signal SGH from the control device 200, the display device 100 makes a copy of the left-eye image GB of the signal SGH, and handles the copied image as the right-eye image. For example, the controller 150 copies the left-eye image GB of the signal SGH as the right-eye image, and outputs the signal SG' obtained by adding the right-eye image to the left-eye image to the display unit 110. The display device 100 causes the scanning circuit 114 to sequentially scan the scanning lines $P_1$ to $P_{1700}$ to display the images each represented by the signal SGH in the display region EA of the display panel 111A and the display region EB of the display panel 111B. That is, the display device 100 displays the left-eye image GB of the signal SGH in both the display region EA of the display panel 111A and the display region EB of the display panel 111B. As a result, the user can view the left-eye images GB and GB displayed on the display device 100.

After receiving the signal of the image including only one of the right-eye image and the left-eye image corresponding to the display region indicated by the display region information, the display device 100 can display the received image in the display regions of both the right-eye region 110A and the left-eye region 110B indicated by the display region information. Therefore, the control device 200 only needs to output the signal of the image including only the right-eye image or the left-eye image to the display device 100. As a result, the processing load can be reduced.

In the display system 1A according to the sixth embodiment, when the display device 100 is in the first mode, the control device 200 generates an image having 4.9 million (2880×1700) pixels. When the display device 100 is in the second mode, the control device 200 generates an image having 2.45 million (1440×1700) pixels, which are half as many as 4.9 million (2880×1700) pixels.

For example, a case will be described where the control device 200 uses the GPU capable of generating 90 images per second (90 fps) at the image resolution of 1920×1080. When the display device 100 is in the first mode, the control device 200 generates 38 images each having 4.9 million pixels in each second. When the display device 100 is in the second mode, the control device 200 generates 76 images each having 2.45 million pixels in each second. In this case, the display system 1A cannot perform the smooth display because the drop frame or the screen tearing occurs in the first mode, but can perform the smooth display without causing the drop frame or the screen tearing in the second mode. Therefore, the display system 1A can allow the user to view the smooth display by allowing the user to set the display device 100 to the second mode depending on the graphic performance of the control device 200.

In the display system 1A according to the sixth embodiment, since the display device 100 can change the size of the image from the control device 200 depending on the mode to reduce the resolution of the display panels 111A and 111B, the processing load of the control device 200 can be reduced. As a result, when the display system 1A uses the display unit 110 used for VR, the display system 1A can restrain the occurrence of the drop frame and the screen tearing even if the graphic performance of the control device 200 is low. Consequently, the image displayed in each of the right-eye region 110A of the display panel 111A and the left-eye region 110B of the display panel 111B can be restrained from decreasing in visibility.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure naturally belong to the technical scope of the present disclosure.

In the first, second, fourth, and fifth embodiments described above, the case has been described where the second signal output unit 113B of the signal output circuit 113 included in the display control circuit outputs the non-display signals to the signal lines corresponding to the scanning lines $P_1$ to $P_{450}$ and $P_{1251}$ to $P_{1700}$ when the display device 100 is set to the second mode. However, the present disclosure is not limited to this case. The display device 100 may be configured, for example, such that the controller 150 adds the non-display signals to the signals received from the control device 200 when the second mode is set. Furthermore, the controller 230 of the control device 200 may create images corresponding to a black or gray color for the non-display regions, and supply images obtained by synthesizing the created images with the images corresponding to the display regions to the display device 100. With this configuration, the scanning circuit 114 of the display device 100 needs to include only the first scanner 114A. Therefore, the circuit scale can be reduced by an amount of the second scanner 114B and the selector 114C.

In the first, second, fourth, and fifth embodiments described above, the case has been described where the scanning circuit 114 included in the display control circuit 112 collectively drives the scanning lines in the non-display regions when the display device 100 is set to the second mode. However, the present disclosure is not limited to this case. For example, the display device 100 may be configured to drive the scanning lines such that the number of scanning lines driven at the same time in the non-display regions is greater the number of scanning lines driven at the same time in the display regions, or may be configured not to drive the scanning lines corresponding the non-display regions.

In the first, second, fourth, and fifth embodiments described above, the case has been described where the display device 100 disposes the non-display regions on the upper side and the lower side of the display regions in the case of the second mode. However, the present disclosure is not limited to this case. The display device 100 may dispose the non-display regions, for example, on either the upper side or the lower side of the display regions in the case of the second mode.

In the first, second, fourth, and fifth embodiments described above, the case has been described where the second mode of the display device 100 is provided for one display size. However, the present disclosure is not limited to this case. For example, a plurality of modes different from the second mode may be added to the display device 100.

In the embodiments described above, the setting unit 130 of the display device 100 receives the information from the user to select the first mode or the second mode. However, the present disclosure is not limited to this case. One of the first mode and the second mode may be set in accordance with a predetermined condition. The predetermined condition may be a condition representing, for example, a case where the direction of the line of sight of the user has changed by a certain angle in a predetermined time, or a case where the controller 230 has become incapable of processing the images.

The components of the embodiments described above can be combined as appropriate. Other operational advantages accruing from the aspects described in the above-described embodiments that are obvious from the description herein, or that are conceivable as appropriate by those skilled in the art will naturally be understood as accruing from the present disclosure.

What is claimed is:

1. A display device to be disposed in front of both eyes of a user, the display device comprising:
a display panel having a right-eye region and a left-eye region;
a detector configured to detect detection information enabling estimation of a direction of a line of sight of the user;
a setting switch configured to set display region information indicating display regions of the right-eye region and the left-eye region each of which displays an image that follows the direction of the line of sight of the user; and
a controller configured to output the display region information of the setting switch and the detection information of the detector to a control device, wherein
the setting switch is configured to set, as the display region information, information that indicates a first mode of setting an entire region of the right-eye region and an entire region of the left-eye region as the display regions or a second mode of setting a partial region of the right-eye region and a partial region of the left-eye region as the display regions smaller than those in the first mode,
the controller is configured to:
display the received right-eye image in the display region of the right-eye region indicated by the display region information and display the received left-eye image in the display region of the left-eye region indicated by the display region information when the first mode is set by the setting switch; and
display the received right-eye image in the display region serving as the partial region of the right-eye region indicated by the display region information and display the received left-eye image in the display region serving as the partial region of the left-eye region indicated by the display region information when the second mode is set by the setting switch, and
when the second mode is set, a region other than the partial region of the right-eye region indicated by the display region information is a non-display region and a region other than the partial region of the left-eye region indicated by the display region information is a non-display region,
the display panel comprises a display panel including a plurality of scanning lines, and
the display panel is configured to, when the second mode is set, set a region including effective scanning lines in the plurality of scanning lines as the display region, and set a region including scanning lines different from the effective scanning lines as each non-display region.

2. The display device according to claim 1, wherein
the setting switch is configured to set, as the display region information, information that indicates a first mode of displaying different images in the right-eye region and the left-eye region or a second mode of displaying the same image in the display regions of the right-eye region and the left-eye region, and
the controller is configured to:
display the received right-eye image in the display region of the right-eye region indicated by the display region information and display the received left-eye image in the display region of the left-eye region indicated by the display region information when the first mode is set by the setting switch; and
display, after receiving the image including only one of the right-eye image and the left-eye image corresponding to the display regions indicated by the display region information, the received image in both the display regions of the right-eye region and the left-eye region indicated by the display region information when the second mode is set by the setting switch.

3. The display device according to claim 1, wherein
the setting switch is configured to set, as the display region information, information that indicates a first mode of setting an entire region of the right-eye region and an entire region of the left-eye region as the display regions or a second mode of setting a partial region of the right-eye region and a partial region of the left-eye region as the display regions smaller than those in the first mode and displaying the same image in the display regions, and
the controller is configured to:
display the received right-eye image in the display region of the right-eye region indicated by the display region information and display the received left-eye image in the display region of the left-eye region indicated by the display region information when the first mode is set by the setting switch; and
display, after receiving the image including only one of the right-eye image and the left-eye image corresponding to the display regions indicated by the display region information, the received image in both of the display regions that are the partial region of the right-eye region and the partial region of the left-eye region indicated by the display region information when the second mode is set by the setting switch.

4. A display system comprising:
the display device as claimed in claim 1; and
a control device configured to control display of an image on the display device, wherein
the control device comprises a second controller configured to output, to the display device, the image that follows the direction of the line of sight of the user and includes the right-eye image and the left-eye image corresponding to the display regions indicated by the display region information based on the detection information of the detector output by the display device.

5. A display device to be disposed in front of a user, the display device comprising:
a display panel having a right-eye region and a left-eye region;
a detector configured to detect detection information including a direction and movement of a line of sight of the user; and
a controller configured to output the detection information of the detector and a display region information to a control device, the display region information including positional information on a first display region positioned in the right-eye region and positional information on a second display region positioned in the left-eye region, wherein
the control device is configured to output a first image signal of a right-eye image and a second image signal of a left-eye image to the controller,
the controller is configured to display the right-eye image in the first display region and the left-eye image in the second display region,
the display device has a first mode in which an entire region of the right-eye region is the first display region and an entire region of the left-eye region is the second display region, and a second mode in which a partial region of the right-eye region is the first display region and a partial region of the left-eye region is the second display region, when in the second mode, a region other than the partial region of the right-eye region that is the first display region is a non-display region and a region other than the partial region of the left-eye region that is the second display region is a non-display region, the display panel includes a plurality of pixels, and the display region information includes the number of pixels and pixel density of the first display region and the number of pixels and pixel density of the second display region.

6. The display device according to claim 5, wherein a position of the first display region and a position of the second display region are configured to change.

7. The display device according to claim 5, wherein the right-eye image and the left-eye image are changed depending on the detection information.

8. The display device according to claim 7, wherein a position of the first display region and a position of the second display region are configured to change.

9. The display device according to claim 5, wherein the detector is configured to detect one of a position of the display device, an angle of a predetermined surface of the display device with respect to a predetermined direction, movement of the display device, and acceleration of the display device.

10. The display device according to claim 5, wherein the control device is configured to output information on a size of the right-eye image and a size of the left-eye image to the controller.

11. The display device according to claim 5, wherein a position of the first display region and a position of the second display region are configured to be determined by the user.

12. The display device according to claim 5, wherein
the right-eye image is different from the left-eye image in the first mode, and
the right-eye image is the same as the left-eye image in the second mode.

13. The display device according to claim 5, wherein the display device has
a first mode in which the right-eye image is different from the left-eye image, and
a second mode in which the right-eye image is the same as the left-eye image.

\* \* \* \* \*